(12) United States Patent
Brown et al.

(10) Patent No.: US 8,579,359 B2
(45) Date of Patent: Nov. 12, 2013

(54) SIDE SKIRT SYSTEM FOR A TRAILER

(71) Applicants: James Bruce Brown, Crystal Lake, IL (US); Leonard William Baker, Lafayette, IN (US)

(72) Inventors: James Bruce Brown, Crystal Lake, IL (US); Leonard William Baker, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 13/741,639

(22) Filed: Jan. 15, 2013

(65) Prior Publication Data

US 2013/0270857 A1 Oct. 17, 2013

Related U.S. Application Data

(62) Division of application No. 13/448,931, filed on Apr. 17, 2012, now Pat. No. 8,398,150.

(51) Int. Cl.
*B60J 1/20* (2006.01)
*B62D 35/02* (2006.01)

(52) U.S. Cl.
USPC ............ 296/180.4; 296/180.1; 280/851

(58) Field of Classification Search
USPC .......... 296/180.1, 180.2, 180.3, 180.4, 181.2; 180/903; 105/1.1, 1.3; 280/154, 159, 280/851
See application file for complete search history.

(56) References Cited

U.S. PATENT DOCUMENTS

| | | | |
|---|---|---|---|
| 357,800 A | 2/1887 | Wescott | |
| 495,801 A | 4/1893 | Henthorne | |
| 564,027 A | 7/1896 | Pratt | |
| 824,541 A | 6/1906 | Hager et al. | |
| 1,127,241 A | 2/1915 | Hawksworth | |
| 2,318,863 A | 5/1943 | Otto | |
| 3,256,655 A | 6/1966 | Teter | |
| 3,401,953 A * | 9/1968 | Prohl et al. ............... | 280/851 |
| 3,483,939 A | 12/1969 | Maddock et al. | |

(Continued)

FOREIGN PATENT DOCUMENTS

| | | |
|---|---|---|
| EP | 0 738 621 A1 | 10/1996 |
| EP | 0 857 620 A1 | 8/1998 |
| WO | 03/093066 A1 | 11/2003 |

OTHER PUBLICATIONS

Laydon Composites, LTD website, Trailer Skirt Catalog as existed on Feb. 7, 2009, accessed via the Internet Archive WayBack Machine on Oct. 3, 2011 found at http://web.srchive.org/web/20090207195226/http://www.laydoncomp.com/trailer-skirts.php.*

(Continued)

*Primary Examiner* — Glenn Dayoan
*Assistant Examiner* — Jason S Daniels

(57) ABSTRACT

A side skirt system for reducing drag on a trailer includes a side skirt wall configured to be coupled to one side of the trailer to extend below a side wall of the trailer along a length of the trailer. A mounting bracket assembly of the system is coupled to the side skirt wall and is configured to be coupled to a floor assembly of the trailer. The mounting bracket assembly is configured to tilt laterally outwardly and laterally inwardly with respect to a generally vertical axis parallel to the side wall of the trailer.

15 Claims, 25 Drawing Sheets

(56) References Cited

U.S. PATENT DOCUMENTS

| | | |
|---|---|---|
| 3,608,928 A | 9/1971 | Hooker |
| 3,711,146 A | 1/1973 | Madzsar et al. |
| 3,852,965 A | 12/1974 | Rudd |
| 3,859,797 A | 1/1975 | Ayers |
| 4,045,962 A | 9/1977 | Preus |
| 4,060,268 A | 11/1977 | Page, Jr. |
| 4,104,884 A | 8/1978 | Preus |
| 4,190,381 A | 2/1980 | Knaus et al. |
| 4,282,946 A | 8/1981 | MacGuire |
| 4,421,333 A | 12/1983 | VanDyke |
| 4,611,847 A | 9/1986 | Sullivan |
| 4,688,824 A | 8/1987 | Herring |
| 4,746,160 A | 5/1988 | Wiesemeyer |
| 4,943,204 A | 7/1990 | Ehrlich |
| 5,094,744 A | 3/1992 | Scovell |
| 5,152,228 A | 10/1992 | Donkin |
| 5,280,990 A | 1/1994 | Rinard |
| D354,726 S | 1/1995 | Fitgerald |
| 5,489,137 A | 2/1996 | Herrmeyer |
| 5,607,200 A | 3/1997 | Smidler |
| 5,673,953 A | 10/1997 | Spease |
| 5,921,617 A * | 7/1999 | Loewen et al. ............ 296/180.4 |
| 6,079,769 A | 6/2000 | Fannin et al. |
| 6,109,675 A | 8/2000 | Sumrall |
| 6,116,667 A | 9/2000 | Torcomian |
| 6,257,654 B1 | 7/2001 | Boivin et al. |
| 6,443,492 B1 * | 9/2002 | Barr et al. ..................... 280/851 |
| 6,485,087 B1 | 11/2002 | Roberge et al. |
| 6,626,475 B2 | 9/2003 | Schroeder |
| 6,644,720 B2 | 11/2003 | Long et al. |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,974,166 B2 | 12/2005 | Ledford et al. |
| 6,974,178 B2 | 12/2005 | Ortega |
| 7,059,819 B2 | 6/2006 | Brackmann et al. |
| 7,086,674 B2 | 8/2006 | Goertz |
| 7,093,889 B2 | 8/2006 | Graham |
| 7,134,820 B2 | 11/2006 | Ehrlich |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,497,502 B2 | 3/2009 | Wood |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,887,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,398,150 B2 | 3/2013 | Brown et al. |
| 2003/0178611 A1 | 9/2003 | Anderson |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Peterson |
| 2007/0114757 A1 | 5/2007 | Vickroy |
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 * | 9/2010 | Andrus et al. ............ 296/180.4 |
| 2010/0264690 A1 | 10/2010 | Brown et al. |
| 2010/0264691 A1 | 10/2010 | Giromini et al. |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2012/0169086 A1 | 7/2012 | Giromini et al. |
| 2012/0200113 A1 | 8/2012 | Brown et al. |

OTHER PUBLICATIONS

European Search Report for European Application No. 10765160.6, Mar. 18, 2013, 5 pages.
Office action in U.S. Appl. No. 13/413,998 dated Nov. 2, 2012 (9 pages).
AeroFlex Fairing(TM) product info Page (1 page), Jul. 7, 2010.
AeroFlex Belly Fairing(TM) product info Page (2 pages), Jul. 7, 2010.
AeroFlex Low Rider Belly Fairing product info Page (1 page), Jul. 7, 2010.
AeroFlex Freight Wing chassis Belly Fairing product info Page (1 page), Jul. 7, 2010.
Trailer Fairings from http://www.laydoncomp.cm/trailer-skirts.php (3 pages), Jul. 7, 2010.
Trailerskirt (TM)Assembly Instructions, Jun. 12, 2009 REV. 8.0 supersedes all other version, LCL-ENG-045, (7 pages).
"MFS Skirt, Maximum Flex Skirt", Transtech Composite, (2 pages), undated material.
Side Skirt Fairing: Overview. "Aeroefficient-Aerodynamic Solution for the Trucking Industry", 2010 Aeroefficient (12 pages).
Truck Fuel Savings, Aerodynamic Fairing, Aerodynamic Parts, Truck Industry "WINDYNE", (2 pages), Jul. 7, 2010.
Laydon Composites, LTD. website, Trailer Skirt Catalog as existed on Feb. 7, 2009, accessed via the Internet Archive WayBack Machine on Oct. 3, 2011, found at http://web.srchive.org/web/20090207195226/http://www.laydoncomp.com/trailer-skirts.php.
2008 Product Catalog for Takler Srl (31 pages).
The International Search Report and the Written Opinion of the International Searching Authority for related International Application No. PCT/US2010/031173, dated Jun. 14, 2010 (13 Pages).
Strehl Trailer Blade Brochure, "Trailer Blade(TM) Model 715 Advanced Aerodynamic Trailer Skirt", 5 pages 2009-2010.
Utility Brochure, "Innovative Side Skirt Designs From Utility", 2 pages 2010.
Office Action in U.S. Appl. No. 12/760,798 dated Oct. 13, 2011 (12 pages).
Office Action in U.S. Appl. No. 13/448,931 dated Jun. 29, 2012 (12 pages).
Dec. 12, 2011 letter from Albert L. Underhill Law Office, P.L.L.C. to Carli E. Stewart, Chief Patent Counsel, Wabash National, L.P. (2 pages).
Office action in U.S. Appl. No. 13/413,998 dated Jul. 10, 2012 (9 pages).

* cited by examiner

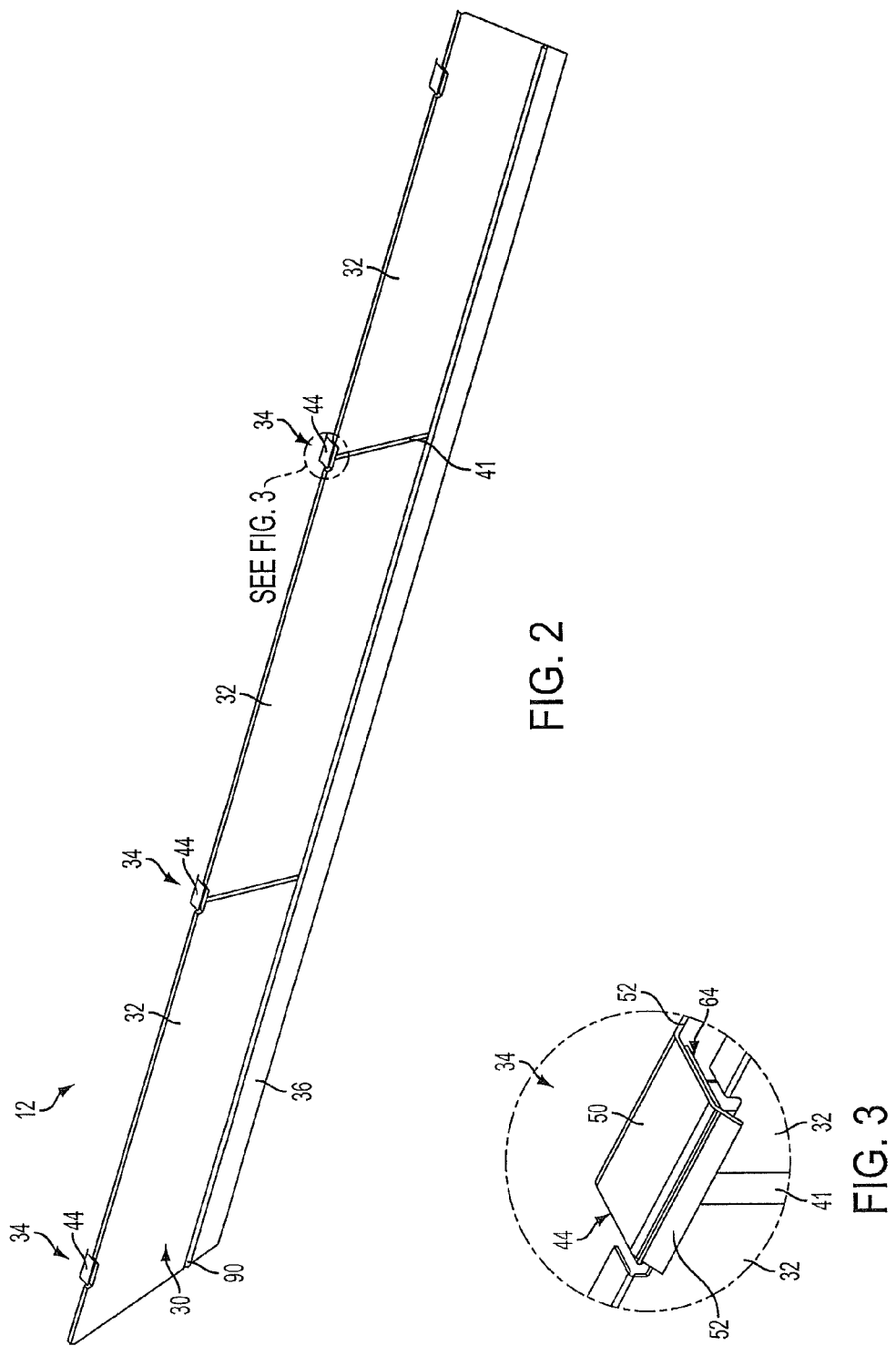

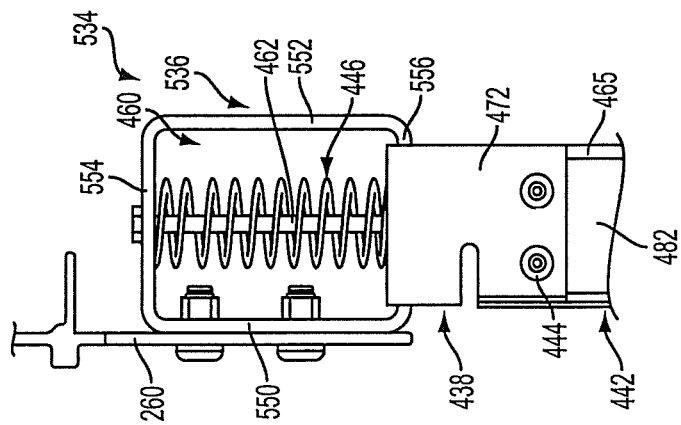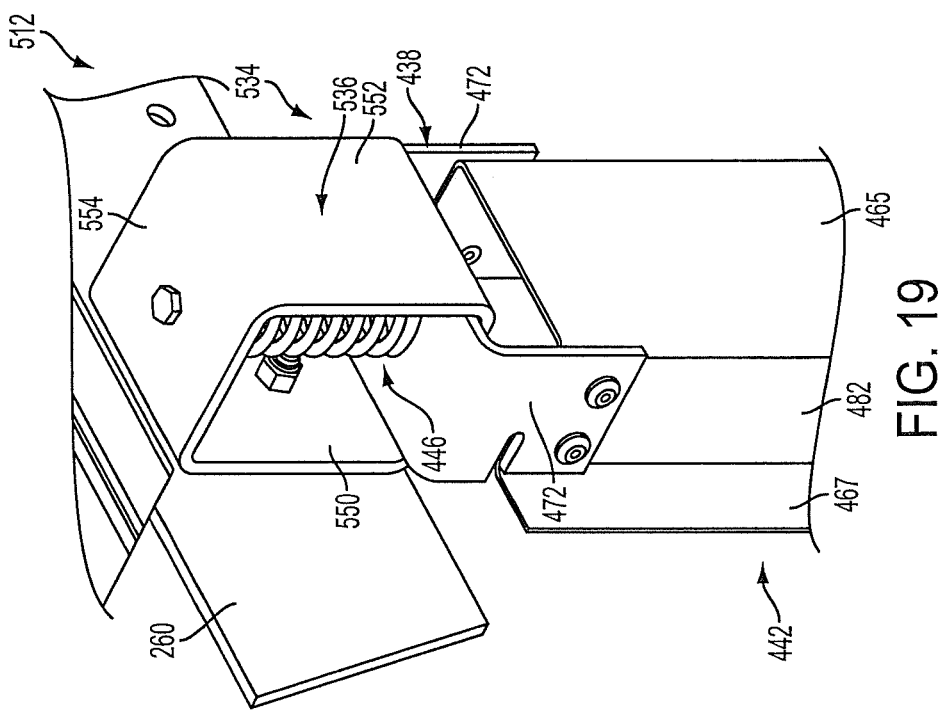

SIDE SKIRT SYSTEM FOR A TRAILER

This application is a Continuation of U.S. patent application Ser. No. 13/448,931 filed Apr. 17, 2012 entitled SIDE SKIRT SYSTEM FOR A TRAILER, which is a Continuation of U.S. patent application Ser. No. 12/760,798 (now U.S. Pat. No. 8,177,286) filed Apr. 15, 2010 entitled SIDE SKIRT SYSTEM FOR A TRAILER, which claims priority under 35 U.S.C. §119(e) to U.S. Provisional Patent Application Ser. No. 61/169,933 filed Apr. 16, 2009 entitled SIDE SKIRT AND SIDE UNDERRIDE CABLE SYSTEM FOR A TRAILER, the entirety of each which is hereby incorporated by reference herein.

Cross-reference is herein made to U.S. Utility application Ser. No. 12/760,802 (now U.S. Pat. No. 8,162,384) filed Apr. 15, 2010 entitled SIDE UNDERRIDE CABLE SYSTEM FOR A TRAILER and U.S. Utility application Ser. No. 13/413,998 filed Mar. 7, 2012 also entitled SIDE UNDERRIDE CABLE SYSTEM FOR A TRAILER, the entirety of each which is hereby incorporated by reference herein.

FIELD OF THE INVENTION

The present invention relates generally to semi-trailers, such as van-type trailers, for example. In particular, the present invention relates to both an aerodynamic side skirt system for reducing drag on such a trailer as well as a side underride cable system for preventing an automobile from riding under the trailer in the event of a side impact collision, for example.

BACKGROUND

To reduce wind flow resistance and drag on a trailer, truck, semitrailer, or other vehicle, side skirts have been used which extend downwardly from a bottom of the trailer and/or chassis toward the roadway to partially enclose the floor assembly and undercarriage.

Air flow passing under a ground vehicle imparts a drag force to the vehicle when it impinges on and flows around the vehicle undercarriage components attached to or a part of the underside of a vehicle. Side skirt systems are designed to prevent or control the flow of air from entering the undercarriage region from the side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and alternative fuel-based vehicles, for example.

Truck trailers typically have a higher elevation than passenger vehicles. This presents a risk that a passenger vehicle will underride the trailer in an accident, potentially resulting in damage to the underriding vehicle and injury to occupants therein. Accordingly, some trailers may include a side protection device, or underride guard, in order to reduce the risk of such passenger vehicles underriding the trailer. The side protection device is intended to reduce the extent to which a "passenger vehicle" (as defined in 49 C.F.R. Part 571§) can intrude under the side of a trailer, diminishing passenger compartment intrusion.

SUMMARY

The present invention may comprise one or more of the features recited in the attached claims, and/or one or more of the following features and combinations thereof.

According to one aspect of the present disclosure, a side skirt system for reducing drag on a trailer includes a side skirt wall configured to be coupled to one side of the trailer to extend below a side wall of the trailer at least partially along a length of the trailer, and a mounting bracket assembly coupled to the side skirt wall and configured to be coupled to a floor assembly of the trailer. Illustratively, the mounting bracket assembly is configured to tilt laterally outwardly and laterally inwardly with respect to a generally vertical axis parallel to the side wall of the trailer.

In one illustrative embodiment, the mounting bracket assembly may include a spring configured to be coupled at a first end to the trailer and at a second end to the side skirt wall. Illustratively, the spring may be an extension spring, a torsion spring, a compression spring, or a leaf spring. Further illustratively, if the spring is a torsion spring, the torsion spring may include an upper arm configured to be coupled to the trailer and a lower arm coupled to an upper portion of the side skirt wall. Alternatively, if the spring is a leaf spring, the side skirt assembly may also include a spacer coupled to an inside surface of the side skirt wall such that the leaf spring may include an upper end configured to be coupled to the trailer and a lower end coupled to an inside surface of the spacer. Illustratively, the mounting bracket assembly may include a channel mount configured to be coupled to the side skirt wall for lateral tilting movement therewith. Further illustratively, the spring may be coupled to and positioned above the channel mount.

Illustratively, the mounting bracket assembly may include a channel mount configured to be coupled to the side skirt wall for lateral tilting movement therewith. Further illustratively, the spring may be received within a passageway of the channel mount. The mounting bracket assembly may further include a U-shaped bolt having a curved bottom portion received within the passageway of the channel mount. Illustratively, the spring may be coupled to the curved bottom portion of the U-shaped bolt. The mounting bracket assembly may also include a bracket configured to be coupled to the trailer and a U-shaped support coupled to the channel mount and the bracket. Illustratively, the bracket may include a spring mount configured to receive the spring thereon and the U-shaped support may include an aperture configured to receive the spring mount therethrough.

In another illustrative embodiment, the side skirt wall may be configured to tilt approximately 30 degrees laterally outwardly relative to the vertical axis and approximately 30 degrees laterally inwardly relative to the vertical axis.

In still another illustrative embodiment, the side skirt wall may include a plurality of wall panels coupled to each other. Illustratively, the mounting bracket assembly may be configured to be coupled to two adjacent wall panels. Further illustratively, the side skirt wall may also include a single flexible flap coupled to a bottom portion of each of the plurality of wall panels. The plurality of wall panels may each illustratively be made of a composite material.

In yet another illustrative embodiment, the side skirt system may also include a tether assembly coupled to the side skirt wall and configured to be coupled to the floor assembly of the trailer. Illustratively, the tether assembly may be configured to tilt with the side skirt wall both laterally outwardly and laterally inwardly with respect to the generally vertical axis. Further illustratively, the tether assembly may include a lower bracket and an upper bracket configured to be coupled to the floor assembly, and a pivot bracket coupled to the side skirt wall and pivotably coupled to the lower bracket. Illustratively, the pivot bracket may include a flange coupled to the side skirt wall and a planar portion having a generally vertically-extending slot formed therethrough. Further illustratively, a pivot pin of the tether assembly may be received through the slot and coupled to the lower bracket to allow the pivot bracket to move with the side skirt wall relative to the upper and lower brackets.

According to another aspect of the present disclosure, a side skirt system for reducing drag on a trailer includes a side skirt wall configured to be coupled to one side of the trailer to extend below a side wall of the trailer at least partially along a length of the trailer. Illustratively, the side skirt wall includes a first panel and a second panel adjacent and coupled to the first panel. Further, the side skirt wall is tiltable laterally outwardly and laterally inwardly relative to the trailer with respect to a generally vertical axis parallel to the side wall of the trailer. The side skirt system further includes a mounting bracket assembly coupled to the first and second side skirt wall panels and configured to be coupled to a floor assembly of the trailer. Illustratively, the mounting bracket assembly includes a channel mount coupled to the first and second panels and tiltable laterally outwardly and laterally inwardly with the side skirt wall. The mounting bracket assembly further includes a spring configured be coupled at a first end to the trailer and at a second end to the channel mount.

In one illustrative embodiment, the channel mount may include a rear wall coupled to each of the first and second panels, first and second side walls coupled to the rear wall, and an arm coupled to and extending between each of the first and second side walls. Illustratively, the second end of the spring may be coupled to the arm. Further illustratively, the mounting bracket assembly may also include a generally U-shaped bolt configured to be rigidly coupled to the floor assembly of the trailer. The first end of the spring may be coupled to the U-shaped bolt.

In another illustrative embodiment, the mounting bracket assembly may also include an outward stop and an inward stop configured to be rigidly coupled to the floor assembly of the trailer. Illustratively, the outward stop may operate to prevent laterally-outward tilting movement of the channel mount beyond a predetermined angle and the inward stop may operate to prevent laterally-inward tilting movement of the channel mount beyond a predetermined angle.

In still another illustrative embodiment, the side skirt system may further include a tether assembly coupled to only one of the first and second panels and configured to be coupled to the floor assembly of the trailer. Illustratively, the tether assembly may include (i) a first bracket configured to be coupled to the floor assembly and (ii) a pivot bracket coupled to the one of the first and second side panels and pivotably coupled to the lower bracket for tilting movement with the one of the first and second side panels relative to the lower bracket. Further illustratively, the side skirt system may also include a second tether assembly coupled to only the one of the first and second panels and configured to be coupled to the floor assembly of the trailer. Illustratively, the two tether assemblies may be respectively positioned at approximately one-third the length of the panel two-thirds the length of the panel.

According to another aspect of the present disclosure, a trailer and side skirt system for reducing drag on the trailer includes a trailer having side walls and a floor assembly and a side skirt system coupled to the trailer and extending downwardly below one of the side walls of the trailer at least partially along a length of the trailer. Illustratively, the side skirt system includes a side skirt wall and a mounting bracket assembly coupled to the side skirt wall and the floor assembly of the trailer. Further illustratively, the side skirt wall and a portion of the mounting bracket assembly are configured to tilt laterally outwardly and laterally inwardly relative to the trailer with respect to a generally vertical axis parallel to the side wall of the trailer.

BRIEF DESCRIPTION OF THE DRAWINGS

FIG. 2 is a perspective view of one of the aerodynamic side skirt system coupled to the trailer of FIG. 1.

FIG. 3 is an enlarged, perspective view of a portion of the side skirt system of FIG. 2 showing a mounting bracket assembly of the side skirt system.

FIG. 19 is a perspective view of yet another side skirt system including another mounting bracket assembly.

FIG. 20 is a side view of the mounting bracket assembly of FIG. 19.

DESCRIPTION OF THE ILLUSTRATIVE EMBODIMENTS

Figure 1:
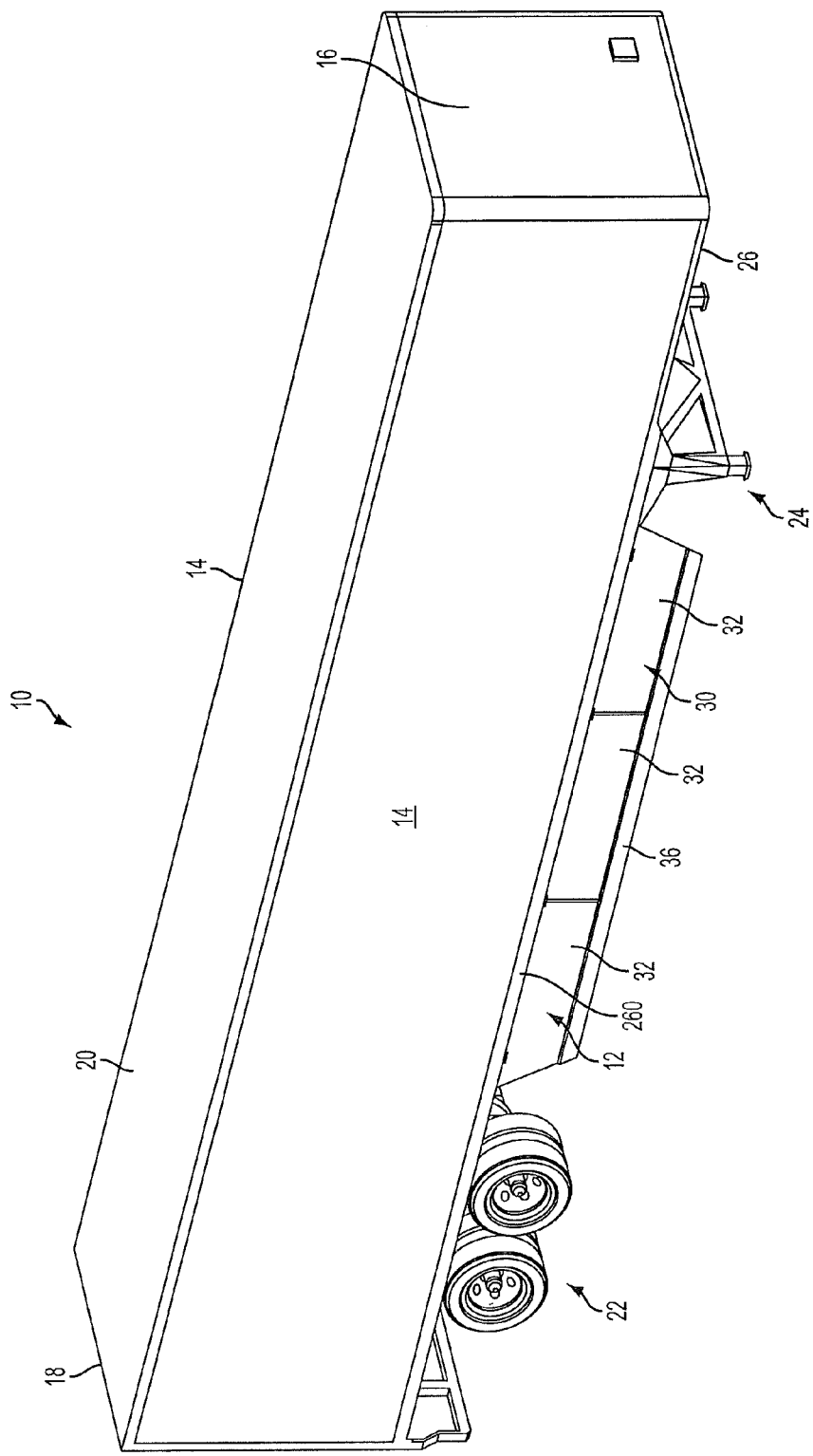
FIG. 1 is a perspective view of a trailer and an aerodynamic side skirt system coupled to the trailer between the rear wheels and the front support of the trailer.

For the purposes of promoting an understanding of the principles of the invention, reference will now be made to a number of illustrative embodiments shown in the attached drawings and specific language will be used to describe the same. While the concepts of this disclosure are described in relation to a trailer, it will be understood that they are equally applicable to other semi-trailers generally, and more specifically to conventional flat-bed and/or box or van type trailers, examples of which include, but should not be limited to, straight truck bodies, small personal and/or commercial trailers and the like.

Looking first to FIGS. 1-8, a trailer 10 includes an aerodynamic skirt system 12 coupled to and extending downwardly from each side wall 14 of the trailer 10. Illustratively, the skirt system 12 operates to improve the aerodynamic efficiency of the trailer 10 by reducing drag and wind flow under the trailer 10. In particular, the skirt system 12 operates to reduce airflow under the trailer 10 while the trailer 10 is traveling down the road. This reduction of airflow under the trailer 10 may increase the fuel efficiency, or the efficiency of any other such source of vehicle drive power, of the tractor/trailer combination. Illustratively, the skirt system 12, as well as other skirt systems described herein, extends below a side wall 14 of the trailer 10 at least partially along a length of the trailer. In particular, as is discussed in detail below, the skirt system 12 extends generally between the landing gear 24 and the rear wheel assembly 22 of the trailer 10. However, the skirt systems described herein may be modified to extend along a greater or a lesser length of the trailer 10 than what is illustratively shown in the figures. In other words, the skirt systems disclosed herein may be modified to extend along the entire, or substantially the entire, length of the trailer 10 or may be modified to extend along only a small portion of the length of the side of the trailer 10.

As shown in FIG. 1, the trailer 10 includes side walls 14, a front end wall 16, a rear end wall 18, and a roof 20 defining an inside storage portion (not shown) able to store various articles or good therein. The trailer 10 further includes a rear wheel assembly 22 and a front support or landing gear 24 each coupled to a bottom wall or floor assembly 26 of the trailer 10. Illustratively, the floor assembly 26 of the trailer 10 includes various laterally-extending cross members 40 and right and left base rails 260 coupled to the cross members and extending along a length of the trailer 10. The front end of the trailer 10 is configured to be coupled to a tractor (not shown) for towing the trailer 10 thereon thus providing a tractor-trailer assembly. It should be understood that while the aerodynamic side skirt system 12 is shown for use with a trailer 10, the side skirt system 12 may be coupled to any vehicle to reduce the drag thereon. As shown in FIG. 1, the skirt system 12 is coupled to the floor assembly 26 of the trailer 10 to extend downwardly from a base rail 260 of the trailer. Illustratively, the side skirt system 12 is positioned between the wheel assembly 22 and the front support 24 in order to prevent air from flowing laterally under the floor assembly 26 of the trailer 10 as the trailer 10 is towed by a tractor.

Illustratively, the trailer 10 includes two aerodynamic skirt systems 12. In particular, one system 12 is coupled to one side of the floor assembly 26 of the trailer 10 to extend downwardly from the floor assembly 26 generally parallel to the corresponding side wall 14 of the trailer 10 while the other system 12 is coupled to the other side of the floor assembly 26 to extend downwardly from the floor assembly 26 generally parallel to the corresponding side wall 14 of the trailer 10. For purposes of the description herein, however, only one skirt system 12 will be described herein. However, it should be understood that the two skirt systems 12 of the trailer 10 are identical in configuration and function.

As shown in FIGS. 1 and 2, the skirt system 12 includes a side skirt wall 30 having three wall panels 32 coupled to each other by an H-member 41, shown in FIGS. 2 and 3. Illustratively, the H-member is generally H-shaped when viewed in cross-section to define two channels such that adjacent wall panels 32 are each received within one of the channels of the H-member 41. The wall panels 32 are further secured to each other and to the trailer 10 by a mounting bracket assembly 34. Illustratively, a first mounting bracket assembly 34 is positioned between and coupled to the middle and rear-most wall panels 32 while a second mounting bracket assembly 34 is positioned between and coupled to the middle and front-most wall panels 32. A third mounting bracket assembly 34 is coupled to the rear-most wall panel 32 while a fourth mounting bracket assembly 34 is coupled to the front-most wall panel 32. Illustratively, while the skirt system 12 includes four mounting bracket assemblies 34 and three wall panels 32, it is within the scope of this disclosure to provide a skirt system 12 having any number of mounting bracket assemblies 34 and any number of wall panels 32. Further, it is within the scope of this disclosure for the skirt system 12 to include a single, unitary wall panel 32 as well.

Figure 6:
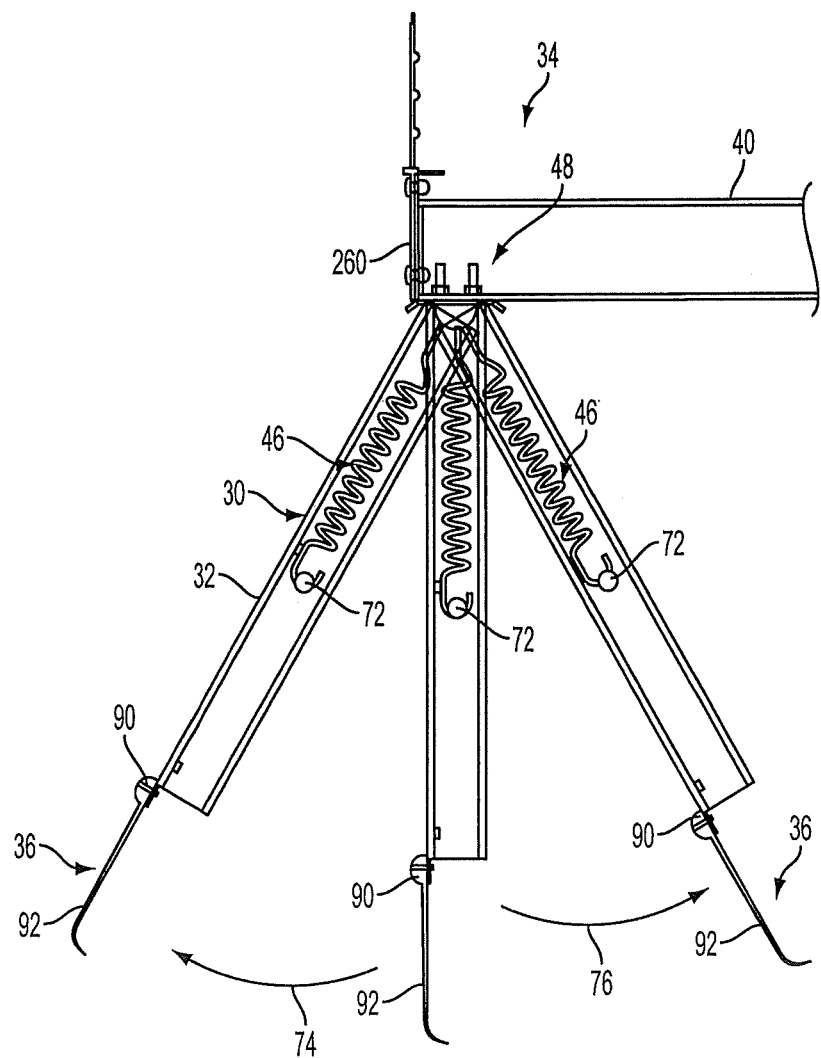
FIG. 6 is a sectional view of the side skirt system of FIGS. 1-5 showing the side skirt system tilted laterally outwardly, tilted laterally inwardly, and in a generally vertical, non-tilted position.

As is discussed in greater detail below, the mounting bracket assemblies 34 are configured to couple the wall portions 32 of the skirt system 12 to the floor assembly 26 of the trailer 10. Furthermore, the mounting bracket assemblies 34 allow the skirt system 12 to tilt laterally both inwardly and outwardly relative to the floor assembly 26 of the trailer 10, as shown in FIG. 6, for example. The ability of the skirt wall 30 to tilt bi-laterally relative to the cross member 40 (i.e., to tilt both inwardly and outwardly relative to the cross-member 40) allows the skirt wall 30 to potentially avoid damage when the trailer 10 traverses into or over a fixed, immovable obstacle, for example, and thus runs laterally into the obstacle, for example. It should also be understood, however, that the skirt system 12 be sufficiently rigidly mounted to the floor assembly 26 such that the skirt system 12 is generally prevented from tilting under normal wind and road air forces.

Illustratively, each wall panel 32 is made of a composite material. For example, the composite material may include a plastic core and metal outer skins coupled to the plastic core. Such a composite material provides a rigid, but lightweight and durable material. Illustratively, for example each wall panel 32 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may be used as well. Further, the wall panels 32 may be of any number of suitable, non-composite materials such as metals, metal alloys, and/or plastics, for example.

As shown in FIG. 2, the skirt system 12 further includes a flexible flap 36 coupled to the bottom edge of the wall panels 32. Illustratively, the flexible flap 36 is made of plastic. However, other suitable materials may be used as well. As is discussed in greater detail below, the flexible flap 36 is further operates to resist airflow and may prevent damage to the skirt wall 30 from forces applied vertically such as in situations where the trailer 10 may traverse over a curb or railroad track where the road surface is not flat. In such instances, for example, the flap 36 is configured to bend, or flex to prevent damage to the skirt wall 30.

As shown in FIG. 2, the skirt system 12 includes a single, unitary flap 36 coupled to the three wall panels 32. However, it is within the scope of this disclosure to include any number of flexible flaps 36. Further illustratively, the wall panels 32 make up approximately 70% of the total height of the skirt wall 30 while the flap 36 makes up approximately the lower 30% of the total height of the skirt wall 30. Of course, it is within this disclosure to include wall panels and/or flaps having other suitable heights as well.

Figure 5:
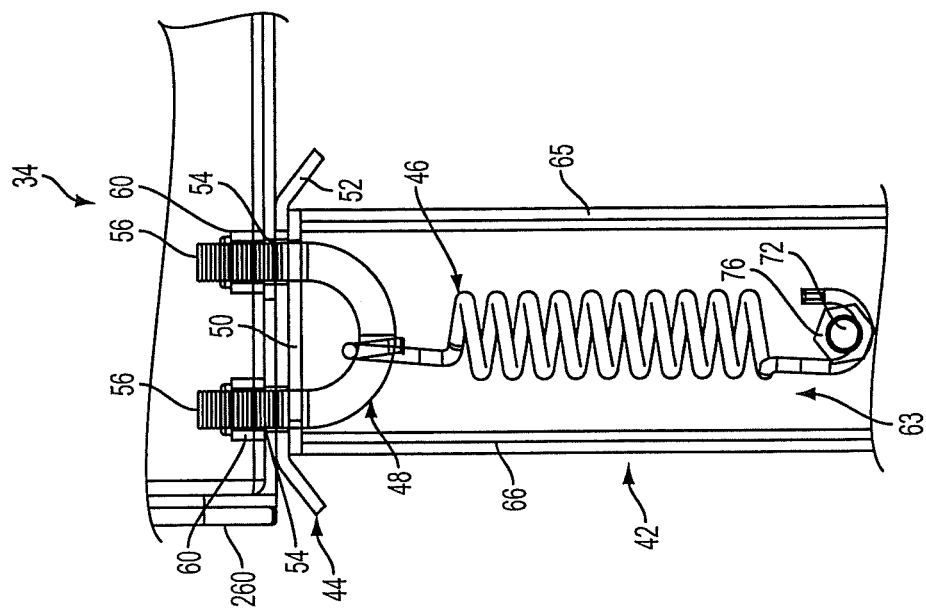
FIG. 5 is a sectional view taken through the mounting bracket assembly of FIG. 4.
Figure 4:
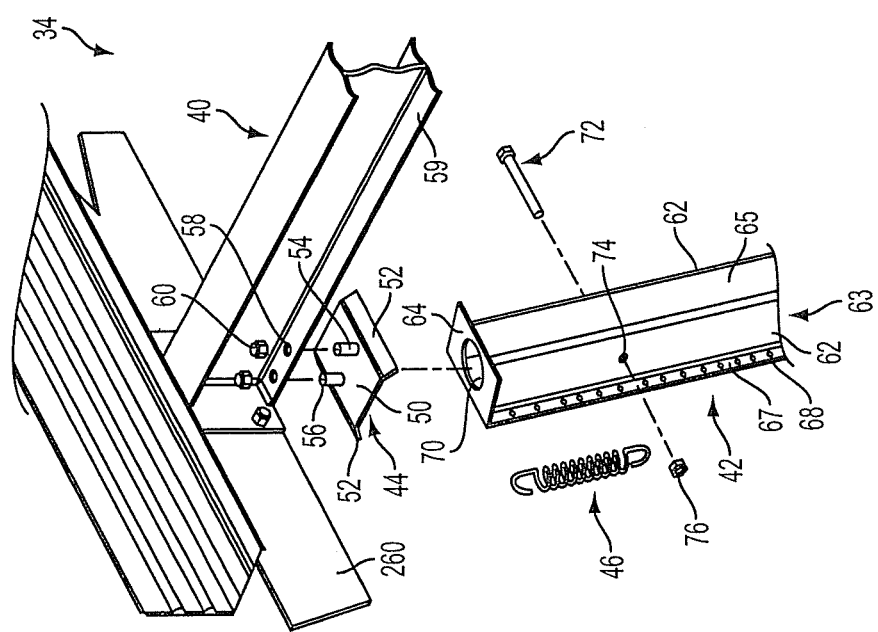
FIG. 4 is an exploded, perspective view of one of the mounting bracket assembly of the side skirt system of FIGS. 1-3.

Looking now to FIGS. 4 and 5, each mounting bracket assembly 34 is coupled to a cross-member 40 of the floor assembly 26 of the trailer 10. Illustratively, each mounting bracket assembly 34 includes a channel mount 42 configured to be coupled to adjacent wall panels 32 of the side wall 30, a mounting plate 44, and an extension spring 46. As shown in FIGS. 4 and 5, the mounting plate 44 includes a base wall 50 and two side flanges 52 coupled to and angled downwardly from each side of the base wall 50. Illustratively, the mounting plate 44 is coupled to the cross-member 40 by a U-bolt 48 received through two apertures 54 formed in the base wall 50 of the mounting plate 44. The U-bolt 48 includes threaded ends 56 which are each received through a respective aperture 58 formed in the bottom, horizontal flange 59 of the cross-member 40. Nuts 60 are threaded onto the ends 56 to secure the U-bolt 48 and the mounting plate 44 to the cross-member 40. Illustratively, while a U-bolt is shown and described herein, it is also within the scope of this disclosure to use an eye bolt or other such fastener onto which the spring 46 may be coupled (as is discussed below).

The channel mount 42 of the mounting bracket assembly 34 includes spaced-apart side walls 62, a top wall 64 coupled to each side wall 62, a rear wall 66 including side flanges 67 extending outwardly therefrom, as shown in FIG. 4, and a front wall 65 coupled to each side wall 62. Illustratively, the side walls 62, front wall 65, and rear wall 66 cooperate to define a passageway 63 therebetween. While the channel mount 42 is shown to include the front wall 65, it is within the scope of this disclosure to include a channel mount lacking such a front wall in order to gain access to the extension spring 46 positioned within the passageway 63. Illustratively, each side flange 67 includes a plurality of apertures 68 formed therein. Each aperture 68 is configured to receive a fastener (not shown) such as a bolt, rivet, or screw, for example, in order to couple the channel mount 42 to a wall panel 32. The top wall 64 of the channel mount 42 includes an aperture 70 configured to receive the U-shaped portion of the U-bolt 48 therein. A bolt 72 is received through an aperture 74 formed in each side wall 62 of the channel mount 42. The bolt 72 is secured to the channel mount 42 by a nut 76 such that the bolt 72 extends horizontally across the passageway 63 of the channel mount 42. As shown in FIGS. 4 and 5, the bolt is positioned below and spaced-apart from the top wall 64 of the channel mount 42. Illustratively, the bolt 72 operates as a bridge or an arm extending between and coupled to each of the side walls 62 of the channel mount 42. Illustratively, it should be understood that any suitable structure may be positioned between and coupled to one or more of the side walls 62 in order to provide an anchor for the extension spring 46, as discussed below.

The extension spring 46 is coupled at a first, upper end to the U-shaped portion of the U-bolt 48 while a second, lower end of the extension spring 46 is coupled to the bolt 72. In use, therefore, the mounting bracket assembly 34 is tiltable relative to the cross-member 40 of the trailer 10. In particular, the channel mount 42, including the spring 46 and the bolt 72, is laterally tiltable relative to the cross-member 40 while the U-bolt 48 and the mounting plate 44 remain generally stationary with the cross-member 40. As shown in FIG. 6, for example, the channel mount 42 and the side wall 30 mounted thereto are laterally tiltable outwardly in a direction 74 away from the trailer 10 and inwardly 76 in a direction toward the floor assembly 26 of the trailer 10. Illustratively, the flanges 52 of the mounting plate 44 operate as a stop to prevent further tilting movement of the channel mount 42 relative to the mounting plate 44 in both the outward and the inward directions 74, 76. Further illustratively, the channel mount 42 is configured to tilt approximately 30 degrees outwardly and 30 degrees inwardly relative to its vertical position. However, it is within the scope of this disclosure to provide a channel mount 42 configured to tilt relative to the cross-member 40 of the trailer 10 any suitable degree.

Figures 7, 8:
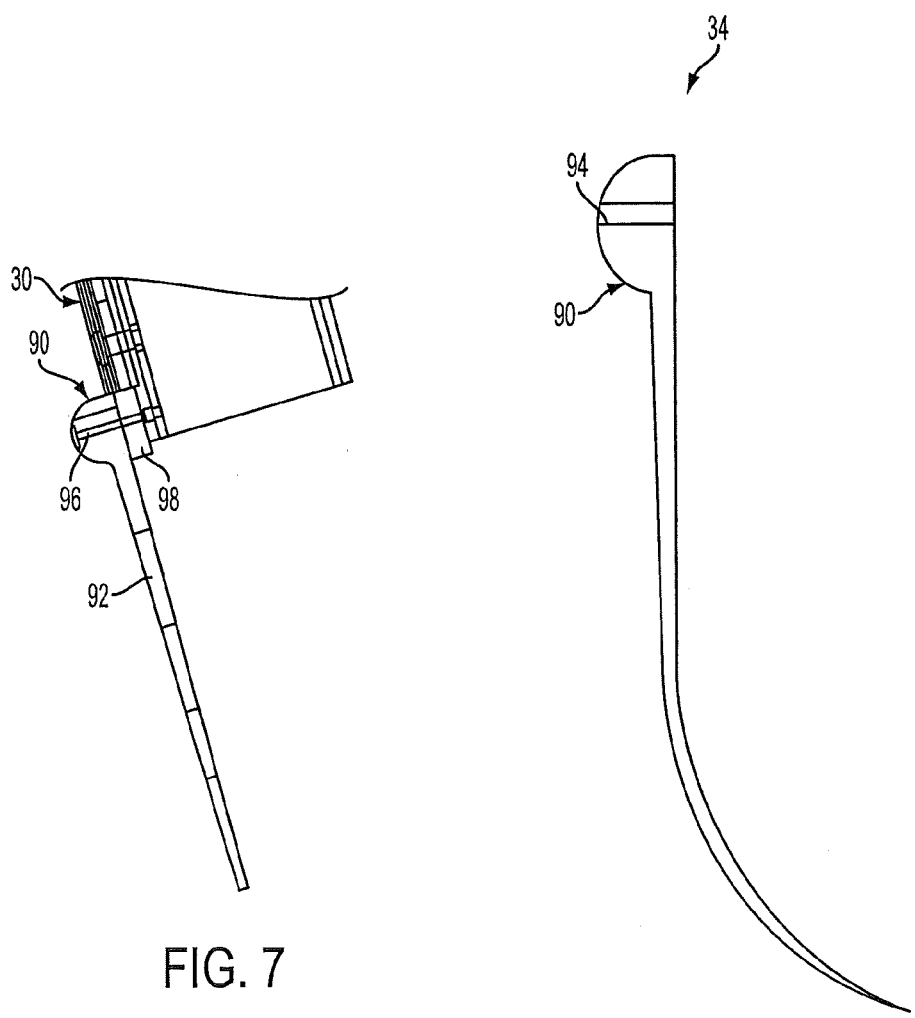
FIG. 7 is a side view of a lower portion of the side skirt system showing a flexible flap of the side skirt system.
FIG. 8 is a side view of the flexible flap showing the flap in a flexed position.

Looking now to FIGS. 7 and 8, the flap 36 of the side skirt assembly 12 is shown. Illustratively, the lower flap 36 includes an upper head 90 and an elongated portion 92 extending downwardly therefrom. A cross-section of the elongated portion 92 is tapered from the upper end to the lower end of the portion 92. Further, the lower end of the portion 92 is bendable and flexible (as shown in FIG. 8) to allow the lower flap 36 to bend in circumstances where the side skirt assembly 12 engages a raised object as the trailer 10 is being towed. The head 90 of the flap 36 includes an aperture 94 configured to receive a fastener 96 therethrough. Illustratively, the fastener 96 is also received through an aperture (not shown) in a bottom end of one of the wall portions 32 in order to secure the flap 36 to the wall panels 32. Further, a strip of tape 98 is provided between the head 90 of the flap 36 and the bottom end of the wall portions 32 in order to further secure the flap 36 to the wall panels 32.

Figure 9:
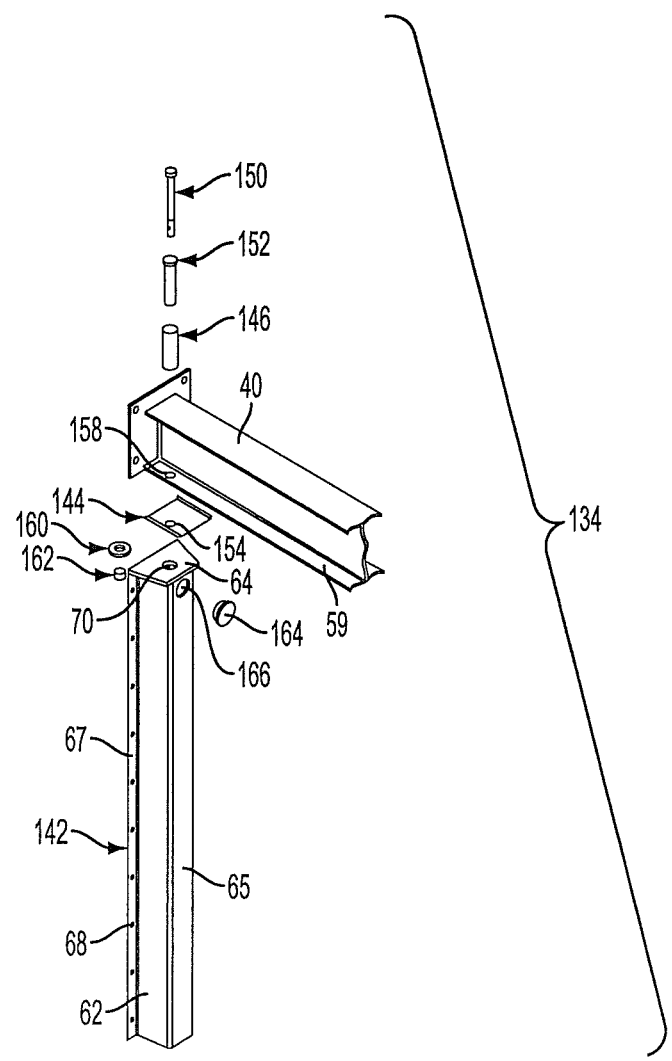
FIG. 9 is an exploded, perspective view of another mounting bracket assembly of the present disclosure.
Figure 10:
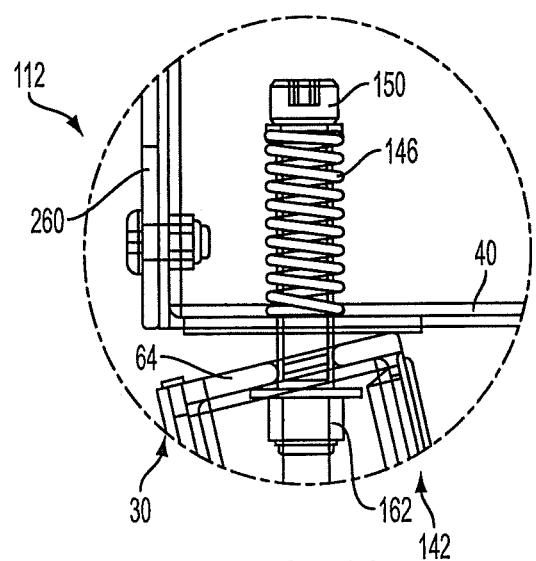
FIG. 10 is a sectional view of a portion of another side skirt system including the mounting bracket assembly of FIG. 7 and showing the side skirt system tilted laterally inwardly.
Figure 11:
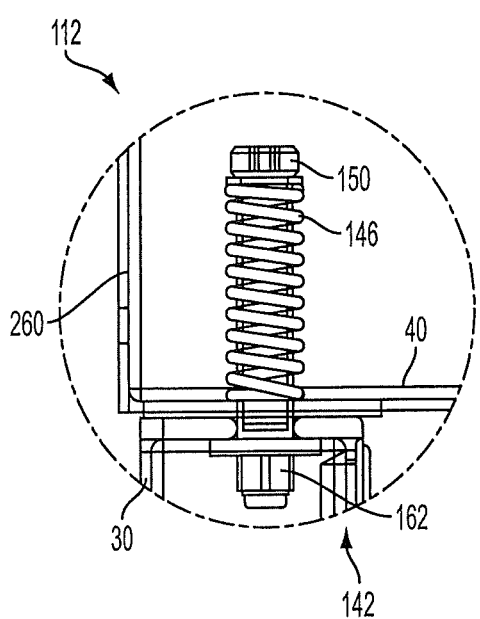
FIG. 11 is a sectional view similar to FIG. 8 showing the side skirt system in a generally vertical, non-tilted position.

Looking now to FIGS. 9-11, another mounting bracket assembly 134 is provided of a skirt system 112. Illustratively, the mounting bracket assembly 134 includes a channel mount 142, a plate 144, and a spring 146. Similar to the assembly 34, the mounting bracket assembly 134 is coupled to the cross-member 40 of the trailer 10 for lateral tilting movement relative thereto. Illustratively, the plate 144 is made of plastic and operates as a wear pad between the tiltable channel mount 142 and the cross-member 40. Of course, while the plate 144 is made of plastic, it is within the scope of this disclosure for the plate 144 to be made of other suitable materials as well.

Illustratively, the channel mount 142 is similar to the channel mount 42 of the mounting bracket assembly 34 discussed above. As such, the same reference numbers are used to denote the same or similar features. For example, the channel mount 142 includes side walls 62, a front wall 65, and a rear wall 66 defining flange portions 67 having apertures 68 formed therein in order to attach a wall panel 32 of the skirt wall 30 thereto. The walls 62, 65, 66 of the channel mount 142 cooperate to define a passageway 63 therebetween. A bolt 150 of the channel mount 142 is received within a spring retainer 152 and the spring 146 is positioned around the spring retainer 152. Illustratively, the spring retainer 152 defines a guide tube which operates as a stop for the nut 162 when the spring 146 is compressed during tilting movement of the channel mount 142 relative to the cross-member 40. The bottom end of the bolt 152 is received through an aperture 158 formed in the flange 59 of the cross-member 40 of the trailer 10 such that the spring retainer 152 and spring 146 are positioned above the flange of the cross-member while a bottom end of the bolt 150 is received through the aperture 158 as well as an aperture 154 formed in the mounting plate 144 and is secured thereto by a washer 160 and a nut 162, as shown in FIGS. 10 and 11.

An access cover 164 is configured to be received within an access aperture 166 formed in the front wall 65 of the channel mount 142 in order to provide a user access to the nut 162 used to secure the bolt 150 to the channel mount 142 and cross-member 40. Illustratively, the access cover 164 may be made of plastic or rubber; however, it is within the scope of this disclosure to provide an access cover made of any suitable material. Illustratively, while the lock nut 162 is provided to secure the bolt 150 to the channel mount 142 and the cross-member 40, it is within the scope of this disclosure to use another fastener such as a castle-type nut with a cotter pin, for example.

In use, the mounting bracket 134 operates the substantially the same as the mounting bracket assembly 34 in that the channel mount 142 is tiltable relative to the cross-member 40 of the trailer 40 in order to allow the skirt wall 30 coupled to the channel mount 142 of each mounting bracket assembly 134 to tilt therewith. Illustratively, the mounting bracket 134 is tiltable from its vertical position (shown in FIG. 11) both laterally inwardly (as shown in FIG. 10) as well as laterally outwardly to provide a side skirt assembly 112 that is able to potentially avoid damage when the trailer 10 traverses into or over a fixed, immovable obstacle, for example.

Figure 12:
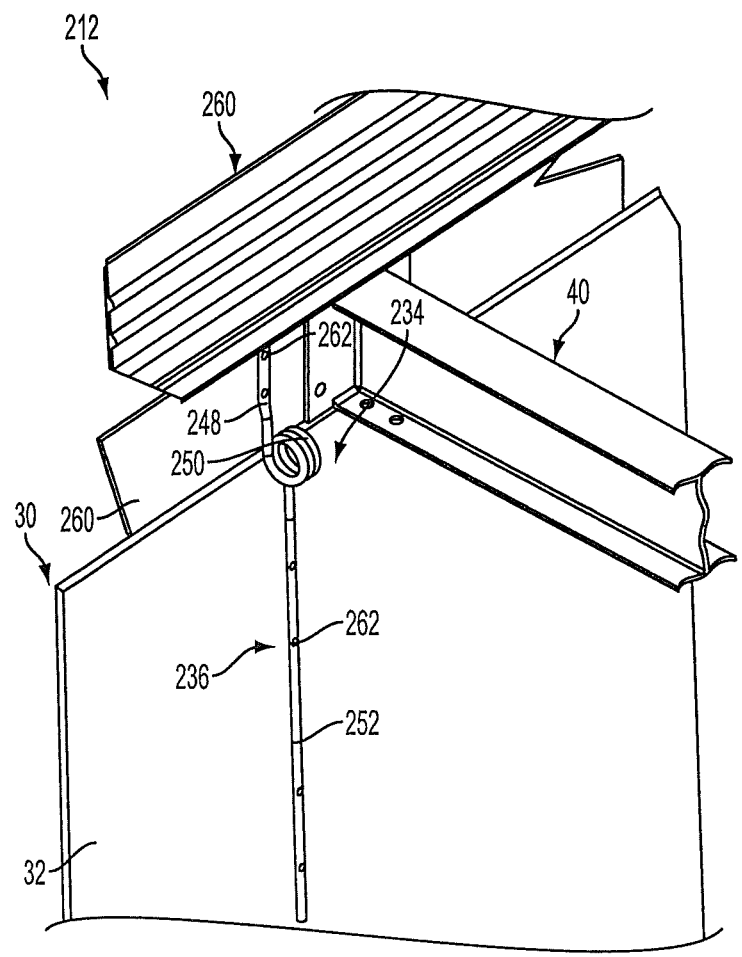
FIG. 12 is a perspective view of yet another side skirt system including a mounting bracket assembly having a torsion spring.
Figure 13:
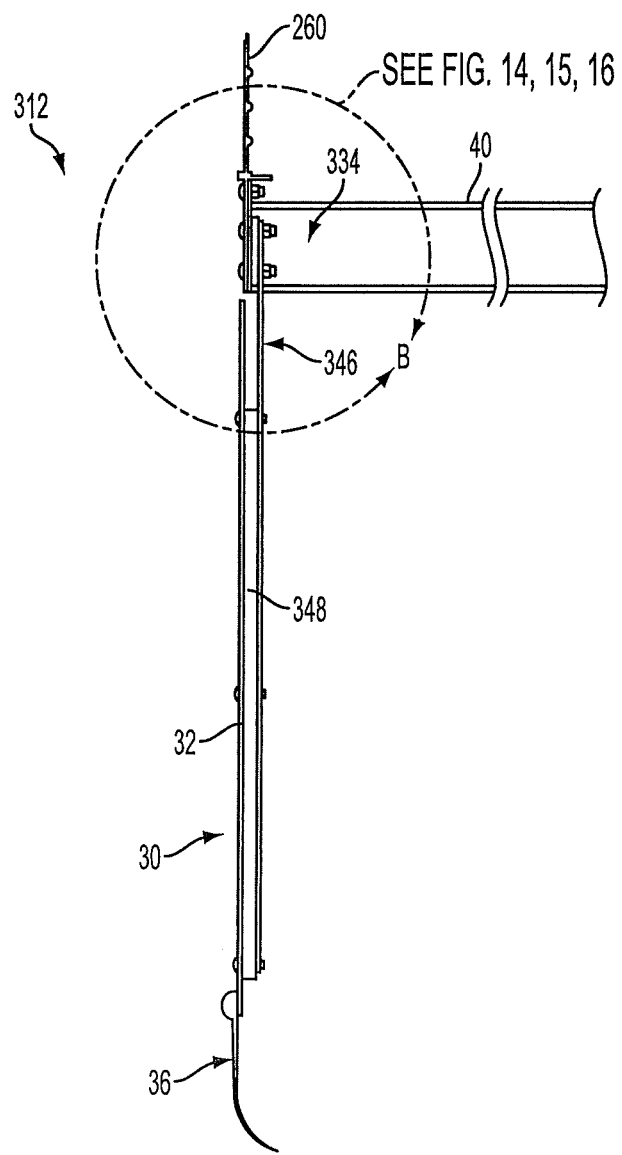
FIG. 13 is a side view of yet another side skirt system including a mounting bracket assembly having a leaf spring.

Looking now to FIG. 12, yet another side skirt system 212 including another mounting bracket assembly 234 is provided to couple the skirt wall 30 to the base rail 260 coupled to the cross-member 40 of the trailer 10. Illustratively, the mounting bracket assembly 234 includes a torsion spring 236 including an upper arm 248, a spring body 250, and a lower arm 252. The upper arm 248 is coupled to the base rail 260 of the floor assembly 26 of the trailer 10 that is illustratively coupled to the cross-members 40 of the trailer 10, as shown in FIG. 12. The upper arm 248 of the torsion spring 234 includes a plurality of apertures 262 each configured to receive a fastener (not shown) therethrough in order to secure the upper arm 248 to the base rail 260. Similarly, the lower arm 252 of the torsion spring 234 includes a plurality of apertures 262 configured to receive a fastener therethrough in order to secure the lower arm 252 to an upper end portion of the skirt wall 30. Similar to the mounting bracket assemblies 34, 134 described above, the mounting bracket assembly 234 shown in FIG. 12 similarly allows the skirt wall 30 to tilt laterally both inwardly and outwardly relative to the cross-member 40 in order to provide a side skirt assembly 112 that is able to potentially avoid damage when the trailer 10 traverses into or over a fixed, immovable obstacle, for example.

Figure 14:
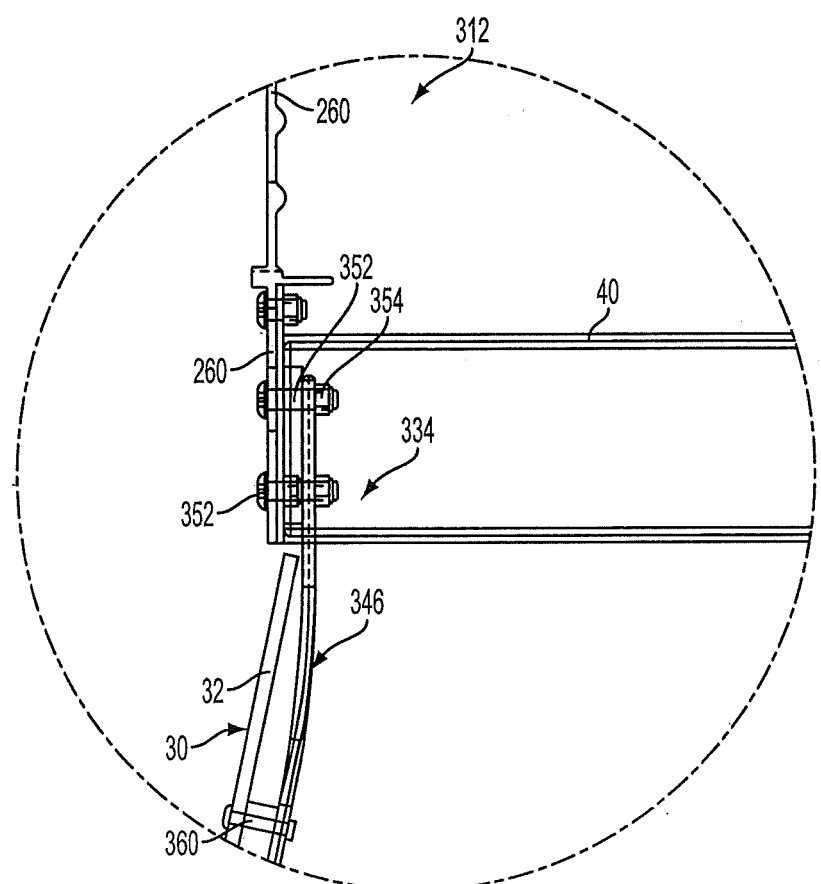
FIGS. 14-16 are enlarged side views of a portion of the side skirt system of FIG. 13 showing the side skirt assembly tilted laterally outwardly, in a vertical position, and tilted laterally inwardly, respectively.
Figure 15:
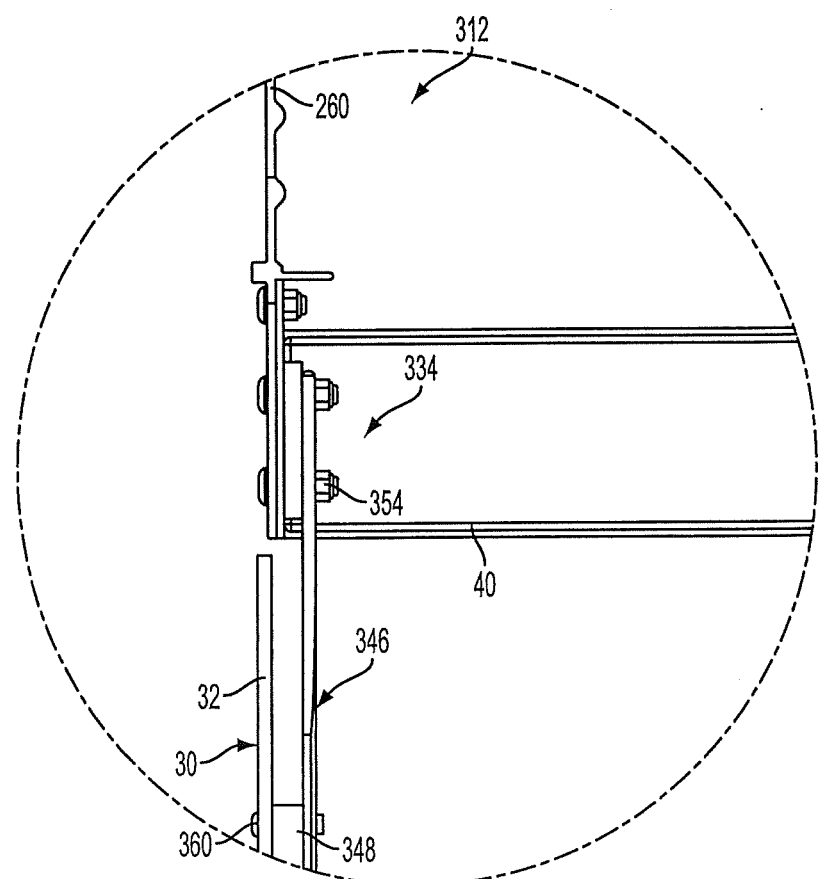
Figure 16:
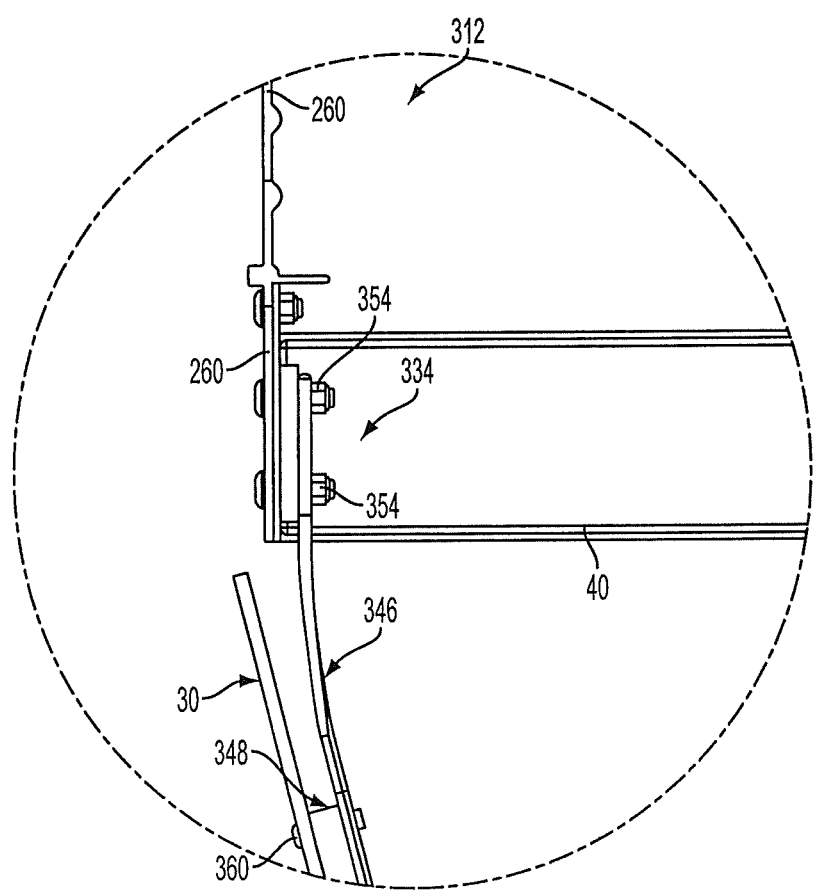

Looking now to FIGS. 13-16, still another side skirt assembly 312 including a mounting bracket assembly 334 is provided to couple the skirt wall 30 to the trailer 10. Illustratively, the mounting bracket assembly 334 includes a leaf spring 346 and a spacer 348 coupled to the skirt wall 30. The leaf spring 346 includes an upper end portion coupled to the base rail 260 of the floor assembly 26 of the trailer 10 by fasteners, such as bolts 352 received through apertures in both the base rail 260 and the leaf spring 346. Illustratively, the bolts 352 are secured to the base rail 260 and leaf spring 346 by nuts 354. Of course, it should be understood that other fasteners, such as rivets, screws, and/or welds may be used as well. The spacer 348 of the assembly 334 is positioned between and coupled to each of the wall panels 32 of the skirt wall 30 and the portion of the leaf spring 346 which hangs below the cross-member 40, as shown in FIG. 14. Fasteners, such as rivets 360 are received through apertures in the wall panels 32, the spacer 348 and the leaf spring 346 in order to couple the three components together. Illustratively, the spacer 348 is made of plastic; however, it should be understood that any suitable material may be used. Similar to the mounting bracket assemblies 34, 134, 234 described above, the mounting bracket assembly 334 shown in FIGS. 13-16 similarly allows the skirt wall 30 to tilt laterally both inwardly (as shown in FIG. 16) and outwardly (as shown in FIG. 14) relative to the cross-member 40 in order to provide a side skirt assembly 112 that is able to potentially avoid damage when the trailer 10 traverses into or over a fixed, immovable obstacle, for example.

Figure 18:
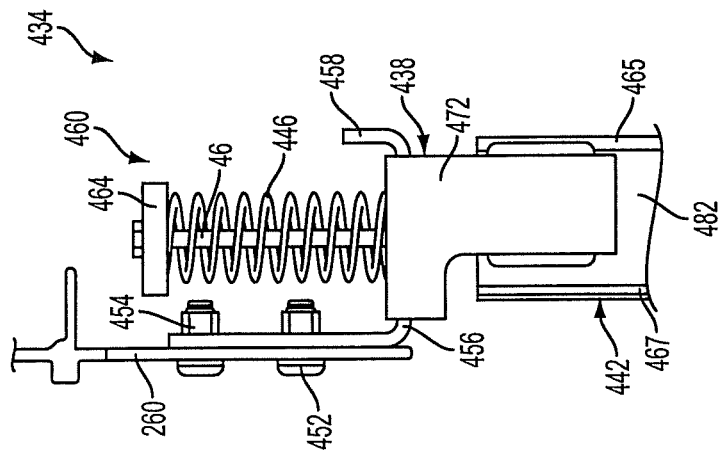
FIG. 18 is a side view of the mounting bracket assembly of FIG. 17.
Figure 17:
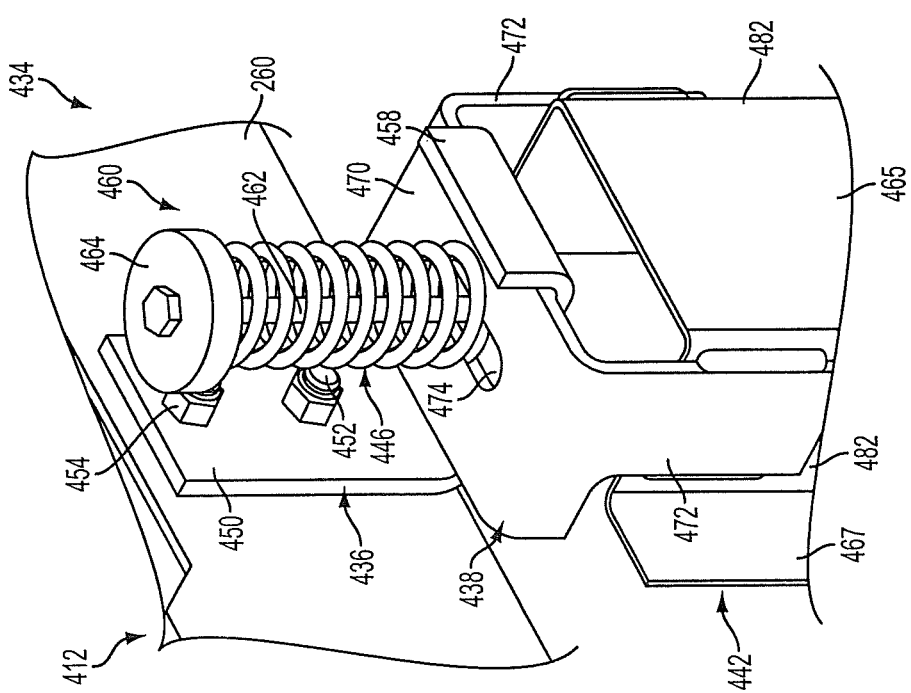
FIG. 17 is a perspective view of still another side skirt system including yet another mounting bracket assembly.

Looking now to FIGS. 17 and 18, still another side skirt system 412 having another mounting bracket assembly 434 is provided to couple the skirt wall 30 to the trailer 10. Illustratively, the mounting bracket assembly 434 is coupled directly to the base rail 260 of the floor assembly 26 of the trailer 10 and includes an L-shaped mount bracket 436, a U-shaped support 438, and a channel mount 442. The channel mount 442 is similar to the channel mounts 42 described above and includes two side walls 482, a front wall 465 coupled to one end of the side walls 482, and side flanges 467 each coupled to the other end of one of the side walls 482. Illustratively, the skirt wall (not shown in FIGS. 17 and 18) is coupled to the flanges 467 of the channel mount 442 in order to tilt with the channel mount 442 relative to the cross-member 40 of the trailer 10.

Illustratively, the L-shaped bracket 436 include a first vertical arm 450 adjacent and coupled to the inside surface of the base rail 260 by two fasteners, such as the nuts and bolts 452, 454. A horizontal seat of the 456 of the bracket 436 is coupled to the first vertical arm 450 and extends in a direction away from the base rail 260 while a second, shorter vertical arm 458 is coupled to the seat 456 and is parallel to and spaced-apart from the first vertical arm 450. A spring mount 460 is rigidly coupled to the seat 456 of the bracket 436 and extends upwardly therefrom. The spring mount 460 includes a spring-receiving post 462 and an upper wall 464 coupled to the post 462. As is discussed in greater detail below, an upper end of the compression spring 446 engaged with the upper wall 464 while a lower end of the spring 446 is engaged with the U-shaped support 438.

The U-shaped support 438 includes a generally horizontal member 470 and an arm portion 472 coupled to each end of the horizontal member 470 such that the arm portions 472 are generally parallel to and spaced-apart from each other. As shown in FIGS. 17 and 18, the horizontal member 470 rests upon and is engaged with the seat 456 of the bracket 436 and is positioned such that the arms 472 of the support 438 hang downwardly. A slot 474 formed in the horizontal member 470 of the U-shaped mount receives the post 462 of the spring mount 460 therethrough. Illustratively, therefore, the bottom end of the spring 446 rests on and is engaged with the upper surface of the horizontal member 470 of the mount 438. Each arm 472 of the U-shaped mount 438 is coupled to a respective one of the side walls 482 of the channel mount 442. Illustratively, the arms 472 are welded to the side walls 482; however, it is within the scope of this disclosure to couple the channel mount 442 and the mount 438 using other suitable fasteners, such as bolts, rivets, screws, etc. Similar to the mounting bracket assemblies 34, 134, 234, 334 described above, the mounting bracket assembly 434 shown in FIGS. 17 and 18 similarly allows the skirt wall 30 to tilt laterally both inwardly and outwardly relative to the cross-member 40 in order to provide a side skirt assembly 112 that is able to potentially avoid damage when the trailer 10 traverses into or over a fixed, immovable obstacle, for example.

Looking now to FIGS. 19 and 20, another side skirt system 512 including another mounting bracket assembly 534 is provided. The mounting bracket assembly 534 is similar to the mounting bracket assembly 434 shown in FIGS. 17 and 18; as such, like reference numerals are used to denote the same or similar components. In contrast to the assembly 434, the assembly 534 includes an alternative mount bracket 536 coupled to the base rail 260 of the trailer floor assembly 26. The bracket 536 includes spaced-apart side walls 550, 552, a top wall 554, and a bottom wall 556 thus defining a generally rectangular structure. The post 462 of the spring mount 460 is coupled to and extends between the top and bottom walls 554, 556 of the bracket 534 and the spring 462 is mounted thereon. The arms 472 of the U-shaped mount 438 are coupled to the side walls 482 of the channel mount 442 by fasteners, such as rivets 444. Further, the seat 456 of the U-shaped mount 438 does not include any slot 474 therethrough. Rather, the seat 456 includes an aperture (not shown) through which the post 462 of the spring mount 460 extends. Similar to the mounting bracket assemblies 34, 134, 234, 334, 434 described above, the mounting bracket assembly 5334 shown in FIGS. 19 and 20 similarly allows the skirt wall 30 to tilt laterally both inwardly and outwardly relative to the cross-member 40 in order to provide a side skirt assembly 112 that is able to potentially avoid damage when the trailer 10 traverses into or over a fixed, immovable obstacle, for example.

Illustratively, the side skirt systems shown in FIGS. 1-20 include skirt walls which are generally parallel to the side walls 14 of the trailer 10. However, it is also within the scope of this disclosure to include a side skirt system having a skirt wall which is angled relative to the side walls 14 of the trailer 10 when the trailer 10 is viewed from above in a plan view, for example. In particular, each of the right and left skirt walls may be installed inwardly from the side walls 14 of the trailer 10 at the front end of the trailer 10 to mount a front end of each skirt wall directly to or adjacent to the landing gear 24 of the trailer 10. In such an embodiment, each skirt wall is angled outwardly from the front end of the skirt wall to the rear end of the skirt wall. Of course, it is also within the scope of this disclosure to angle each skirt wall outwardly from the rear end of the skirt wall to the front end of the skirt wall such that the rear end of the skirt wall is mounted to the trailer 10 at a location inward from the side walls 14 of the trailer.

Further illustratively, the skirt wall 30 shown and described above includes three wall panels 32 coupled to each other by an H-member 41 and a single flexible flap 36 coupled to the bottom edge of the wall panels 32 to provide a skirt wall 30 that tilts outwardly and inwardly as a single unit. However, it is also within the scope of this disclosure to provide a skirt wall wherein the wall panels 30 are able to tilt laterally both inwardly and outwardly generally independently of each other. In such an embodiment, the skirt wall may include a single flexible flap, or may include multiple flap panels each coupled to one of the wall panels 32. Further, such a side skirt system may include the multiple wall panels 32 without the H-member 41 therebetween and an alternative channel mount (not shown) coupled to adjacent wall panels 32 that is able to bend or flex to allow the wall panels 32 to tilt relatively independent of each other. In particular, such an alternative channel mount may be similar to the channel mount 42 shown in FIG. 4, for example. However, the alternative channel mount may be formed to exclude the rear wall 66 of the channel mount 42 such that the alternative channel mount includes only spaced-apart side walls (such as side walls 62), a front wall (such as front wall 65) and a side flange extending outwardly from each side wall (such as side flanges 67). Each side flange may similarly be coupled to one of two adjacent wall panels 32. However, without the H-member 41 interconnecting adjacent wall panels 32 and without any rear wall of the alternative channel mount, the wall panels 32 are able to tilt outwardly and inwardly relatively independent of each other due. Alternatively, the side skirt system may include separate channel mounts each coupled to a single wall panel 32 in order to allow the wall panels 32 to tilt laterally relatively independent of each other.

Figure 21:
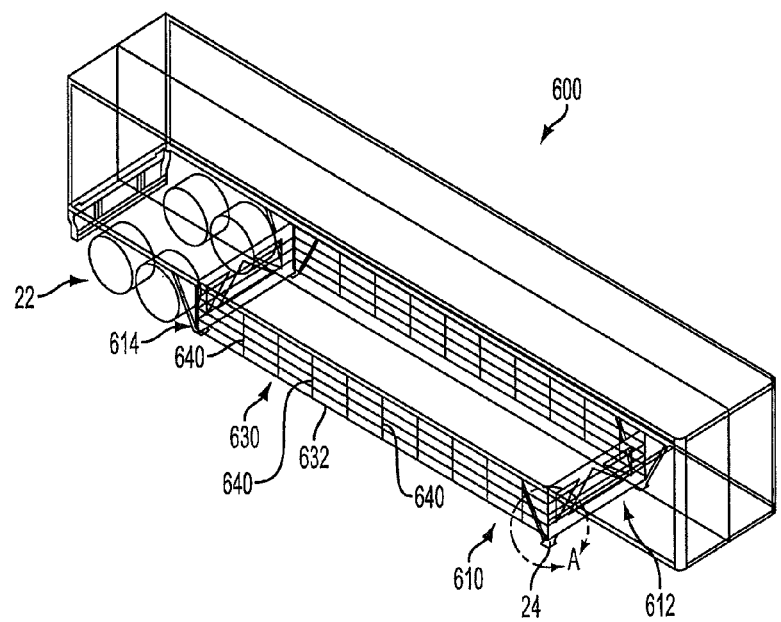
FIG. 21 is a perspective view of a trailer including a side underride cable system coupled thereto in order to reduce the risk of vehicles sliding laterally under the floor assembly of the trailer in a side impact collision, for example.
Figure 22:
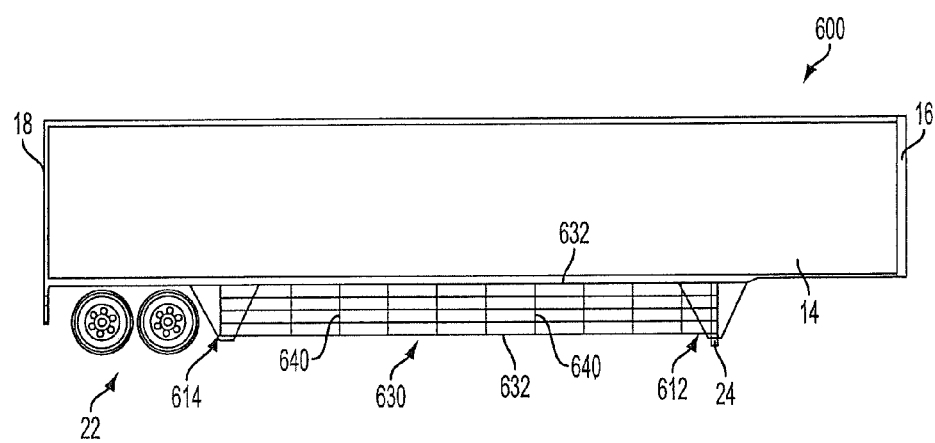
FIG. 22 is a side view of the trailer of FIG. 21.

Looking now to FIGS. 21-27, a trailer 600 includes a side underride system 610 coupled to the floor assembly 26 of the trailer 600. As is discussed in greater detail below, the side underride system extends below and generally along the side walls 14 (shown in FIG. 22) of the trailer 600 in order to prevent an automobile from riding under the trailer 600 in the event of a side impact collision, for example. Illustratively, the side underride system 610 includes front and rear mounting bracket assemblies 612, 614 coupled to the floor assembly 26 of the trailer 600 and a cable system 630 extending therebetween. As shown in FIGS. 21 and 22, the rear assembly 614 is positioned near the rear wheel assembly 22 and the front assembly 612 is positioned near the landing gear 24 of the trailer 600. It should be understood, however, that the front and rear mounting bracket assemblies 612, 614, as well as any other front and rear mounting bracket assemblies disclosed herein, may alternatively be coupled to the trailer 600 at other locations along the length of the trailer 600. In particular, the mounting bracket assemblies 612, 614 may be coupled to the trailer 600 and positioned in spaced-apart relation to each other such that the cable system 630, as well as any other cable system disclosed herein, extends along the entire, or substantially the entire, length of the trailer 600. Alternatively, the mounting bracket assemblies 612, 614 may be coupled to the trailer 600 and positioned in spaced-apart relation to each other such that the cable system 630 extends along only a small portion of the length of the side of the trailer 10.

Figure 23:
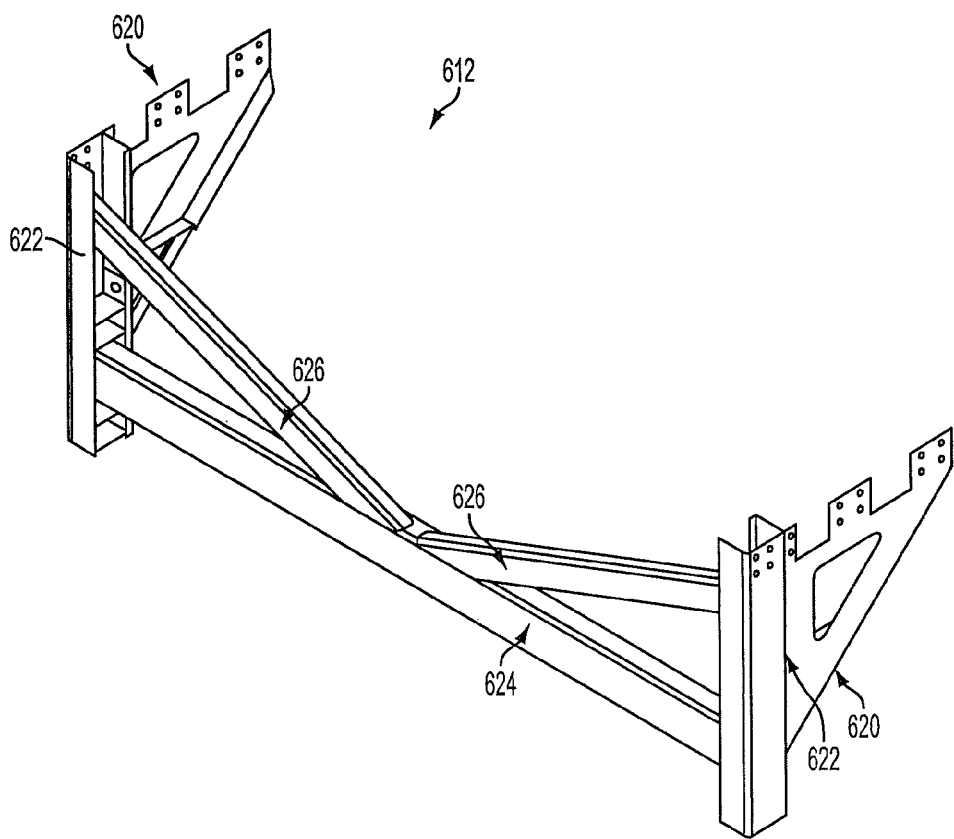
FIG. 23 is a perspective view of one of the mounting bracket assemblies of the side underride cable system.

The front mounting bracket assembly 612 is shown in FIG. 23 and includes side flange members 620 configured to be coupled to the base rail 260 (shown in FIG. 24) of the trailer 600, a vertical corner post 622 coupled to each side flange member 620, a cross-brace 624 coupled to and extending between the corner posts 622, and support braces 626 each coupled at one end to a respective corner post 622 and at an opposite end to the cross-brace 624. Illustratively, the flange members 620 are generally triangular in shape and are each welded to the adjacent corner posts 622; however, it is within the scope of this disclosure to couple the flange members 620 and the posts 622 together using fasteners such as rivets, bolts, screws, etc. Similar to the flange members 620, the corner posts 622 are each configured to be coupled to the base rail 260 of the trailer 600 using a fastener such as a rivet, screw, bolt, etc. Illustratively, while only the front mounting bracket assembly 612 is shown and described in detail herein, it should be understood that the rear mounting bracket assembly 614 is the same as or substantially similar to the front mounting bracket assembly 612. Accordingly, the rear mounting bracket assembly 614 also includes side flange members configured to be coupled to the base rail 260 of the trailer 600.

As shown in FIGS. 21 and 22, the side underride system 610 further includes a cable system 630 including a plurality of cables extending at least partially along a length each of the right and left sides of the trailer 600 from the front mounting bracket assembly 612 to the rear mounting bracket assembly 614. The cable system 630 includes three cables 632 which are each coupled to and terminate in a bottom portion of the corner post 622 of respective mounting bracket assemblies 612, 614. Illustratively, the cables 632 may be steel cables and may be approximately three-eights to ½ inch in diameter. Of course, it is within the scope of this disclosure to include any number of cables made from other suitable materials including composite rope, composite fibers, and other suitable high strength, low stretch materials, and having other suitable diameters as well. Further, the cables 632 may be covered in ballistic nylon or canvas to improve aerodynamic drag reduction thereon.

Cable terminals (not shown) may be used to receive the end of each of the cables 632 therein. Such cable terminals may be formed in and/or coupled to the corner post 622 to secure the cables 632 thereto. Of course, other suitable fasteners may be used to couple the cables 632 to the mounting bracket assemblies 612, 614 as well. In use, the cables 632 are taught and operate as a protective system to reduce the risk of automobiles sliding under the floor assembly of the trailer 600 during a side impact accident. Further, the cables 632 retain some flexibility and thus operate to absorb some of the force and energy of any impact thereto to potentially decrease any forces on the passengers within the automobile that is in the accident with the trailer 600.

Figure 24:
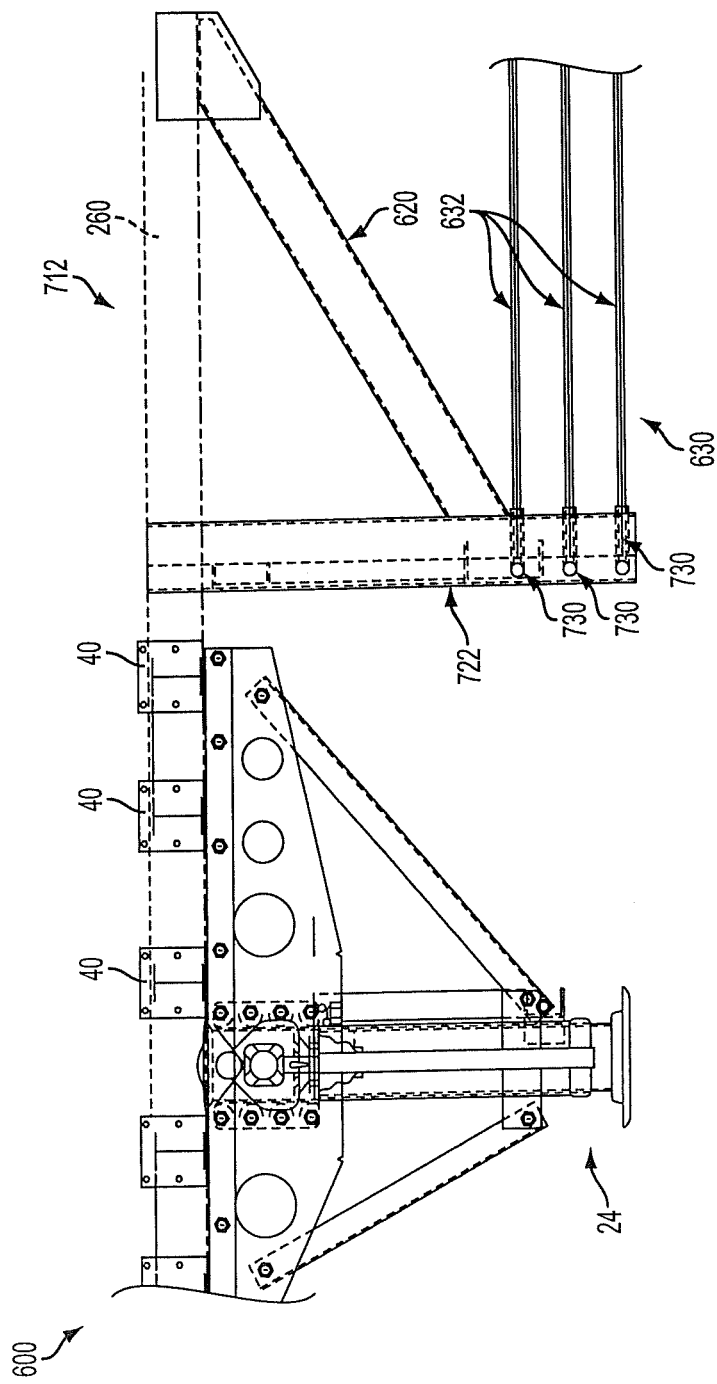
FIG. 24 is a side view of a portion of another mounting bracket assembly for another side underride cable system showing cables of the system where the cables of the system extend across a front and rear width of the system.
Figure 25:
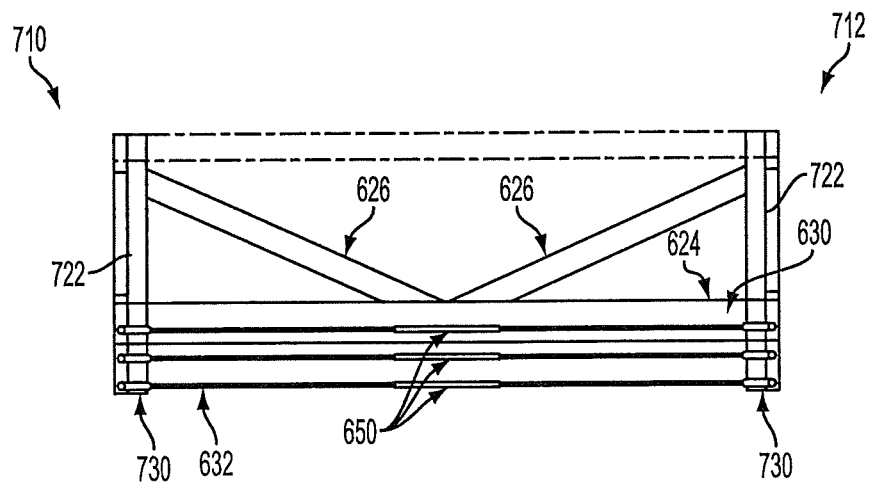
FIG. 25 is an end view of the mounting bracket assembly of FIG. 24 showing lateral cables extending across a width of the trailer.

As shown in FIG. 24, the cable system 630 includes three cables 632 running in parallel to each other at least partially along a length of the trailer 600 to provide the side underride protection to other automobiles. Illustratively, the cable system 630, as well as other cable systems described herein, may be modified to extend along a greater or a lesser length of the trailer than what is illustratively shown in the figures. The cables 632 are approximately four to six inches apart from each other. However, the cable system 630 of the side underride system 600 of the present disclosure may include any number of cables 632 spaced any distance apart from each other. For example, the cable system 630 may include five cables 632, as shown in FIGS. 21 and 22. Such cables 632 may be attached to the corner posts 622 and/or the flange members 620 of the mounting bracket assemblies 620.

Furthermore, the side underride system 600 may also include cable supports 640 (shown in FIG. 21) to support the cables 632 along the length of the trailer 600 between the front and rear mounting bracket assemblies 612. As shown diagrammatically in FIGS. 21 and 22, the cable supports 640 include a plurality of vertical support members coupled to each of the five horizontal cables. The vertical support members are spaced-apart from each other along the length of the cables 632 and operate to provide increased stability and rigidity to the cable system 630. Illustratively, each vertical support may include a chain extending from the top cable 632 to the bottom cable 632 such that each of the five cable 632 is threaded through one of the links of the chain. Further illustratively, the vertical support may include a more rigid beam or bar having five apertures along the length of the bar to receive a respective one of the five horizontally-extending cables 632 therethrough. Each of the vertical supports may be coupled to the floor assembly 26 of the trailer 600. In particular, the cable supports 640 may be coupled to the base rail 260 and/or the cross-members 40 of the trailer 600 and may operate to prevent drooping of the cables 632 and to assist the cables 632 in working together to take loading from a vehicle impact and reduce the extend to which such a vehicle can intrude under the side or ends of the trailer 10.

As shown in FIGS. 21 and 22, the cable system 630 includes cables 632 which run along a length of the trailer 600 from the rear mounting bracket assembly 612 to the front mounting bracket assembly 612 along each of the right and left sides of the trailer 600. However, the cable system 630 may also include cables 632 which run across a width of the trailer 600 from one vertical post 622 of one of the mounting bracket assemblies 612 or 614 to the other vertical post 622 of the same mounting bracket assembly 612 or 614, as shown in the alternative mounting bracket assemblies 712 of FIGS. 24-27, for example. In particular, the mounting bracket assemblies 712 are similar to the mounting bracket assemblies 612; as such, like reference numbers are used to denote the same or similar components. However, the mounting bracket assemblies 712 shown in FIGS. 24-27, include alternative vertical corner posts 722.

Figure 26:
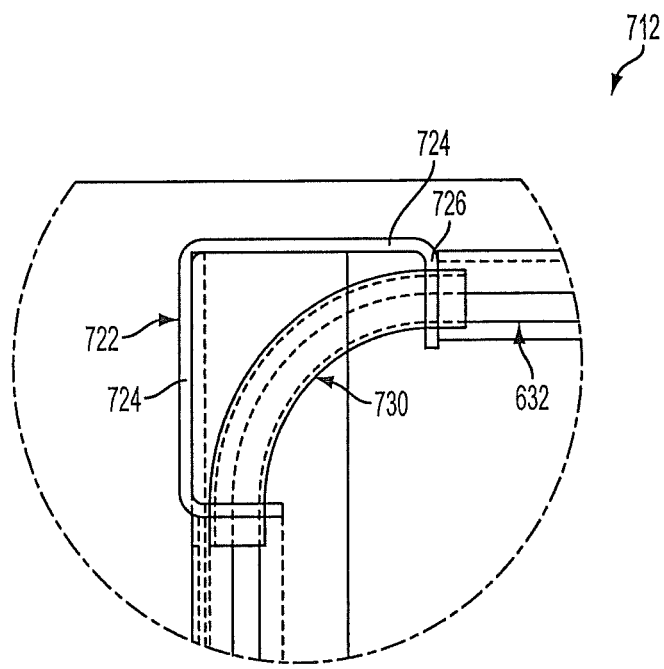
FIG. 26 is a plan view of a portion of the mounting bracket assembly of FIGS. 24 and 25 showing a corner cable guide for threading cable therethrough.
Figure 27:
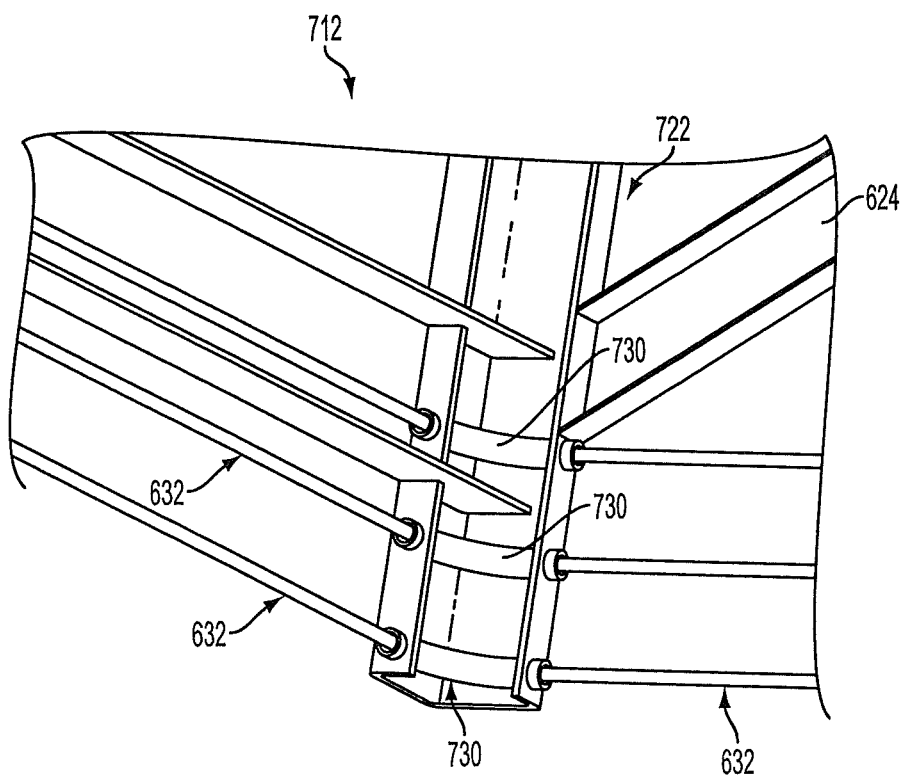
FIG. 27 is a perspective view of a corner portion of the mounting bracket assembly of FIGS. 24-26 showing the corner cable guide.

Illustratively, each post 722 includes first and second adjacent side walls 724 and shortened end walls 726 each coupled to one of the side walls 724. As shown in FIG. 26, the cross-section of each corner post 722 defines a partially-formed square tube. The corner posts 722 further include rounded cable guides 730 coupled to each of the end walls 726 in order to guide a cable 632 therethrough to make a 90 degree bend. As shown in FIGS. 26 and 27, the end of each cable guide 730 is received through an aperture in one of the end walls 726 of the post 722. Illustratively, the cable system 630 shown in FIGS. 24-27 includes three cables 632; thus, the post 722 includes three cable guides 730. Accordingly, the cable system 630 coupled to the mounting bracket assemblies 712 of FIGS. 24-27 may include continuous strands of cables 632 extending along a first side of the trailer 600 from the front mounting assembly 712, to the rear mounting assembly (not shown), across the rear width of the trailer 600 (and thus across the rear mounting assembly), along a second side of the trailer 600 from the rear mounting assembly to the front mounting assembly 712, and across the front width of the trailer 600 (and thus across the front mounting assembly 712). Further, the cable system 630 may include turn buckles 650 coupled to each individual cable 632 in order to tension the cable 632 as desired. Of course, it should be understood that other suitable tensioning devices may be used in order to tension the cables 632 as desired.

Figure 33:
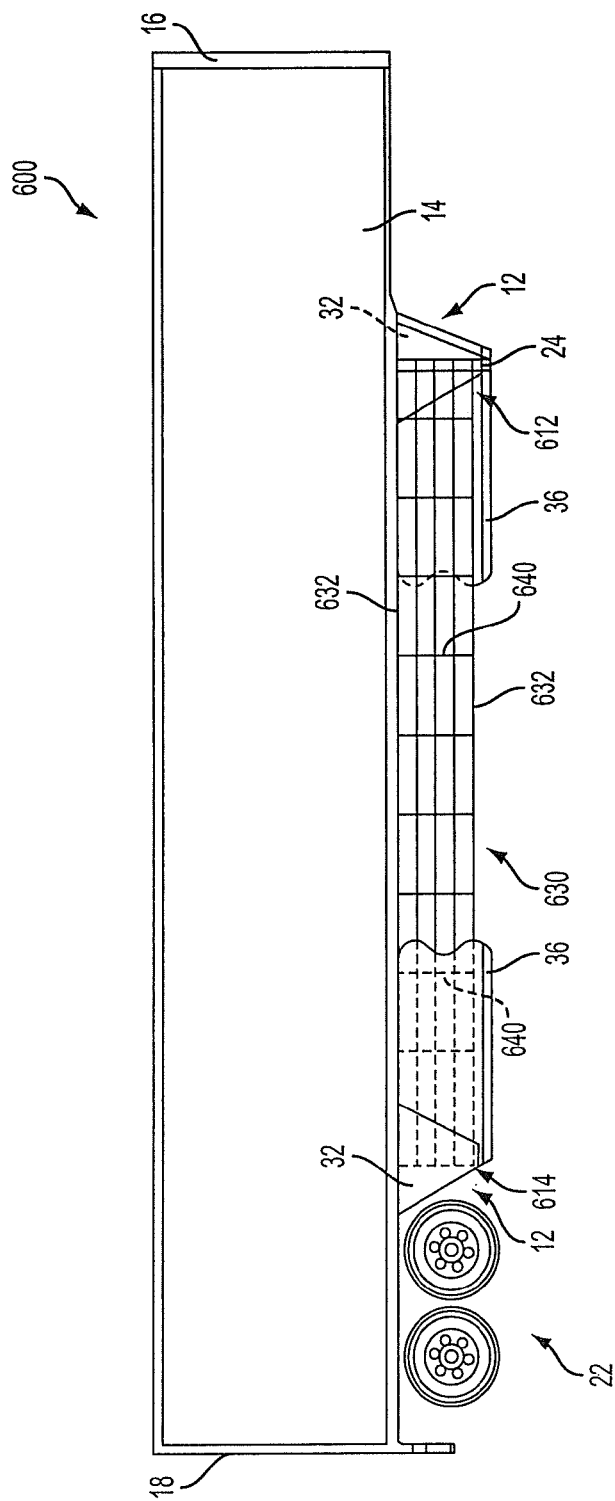
FIG. 33 is a side view of a trailer including both a side underride cable system and a side skirt system, showing the side skirt system able to be positioned both laterally outwardly of the cable system and laterally inwardly of the cable system.

As shown in FIGS. 1-20, a trailer 10 may be provided with a side skirt system 12, 112, 212, 312, 412, 512 including any number of mounting bracket assemblies 34, 134, 234, 334, 434, 534. Further, as shown in FIGS. 21-27, a trailer 600 may be provided with a side underride system 610, 710 including a variety of different cable systems 630 having any number of cables 632 and mounting bracket assemblies 612, 712. Illustratively, the side skirt systems and the side underride systems may be used together, as shown in FIG. 33, to provide a trailer having both a side skirt system extending along the length of each side of the trailer and a side underride system also extending along the length of each side of the trailer. Illustratively, when the side skirt assembly and the side underride system are used together, the side underride system is positioned laterally outwardly from the side skirt assembly in order to allow the side skirt assembly to tilt laterally inwardly a suitable amount, as illustratively shown by the right portion of side skirt system 12 in FIG. 33. However, it is also within the scope of this disclosure to position the side skirt assembly laterally outwardly from the side underride system when mounting both to the same trailer, as illustratively shown by the left portion of the side skirt system 12 in FIG. 33. Illustratively, the cable system of the side underride system and the side wall of the side skirt assembly may be spaced any suitable distance apart from each other as each are mounted to the floor assembly portion of the trailer. It should also be understood that while FIG. 33 illustratively shows the side skirt system 12 used with the cable system 630, any of the side skirt systems disclosed herein may be used with any of the side underride cable systems disclosed herein. Further, the side skirt and cable underride systems disclosed herein may be coupled directly to each other. For example, the side skirt of any one of the side skirt systems disclosed herein may be directly coupled to any one of the cable systems of the underride systems disclosed herein. As noted above, the side underride system may also extend along the width of the trailer at the front and rear mounting assemblies of the side underride system.

Figure 28:
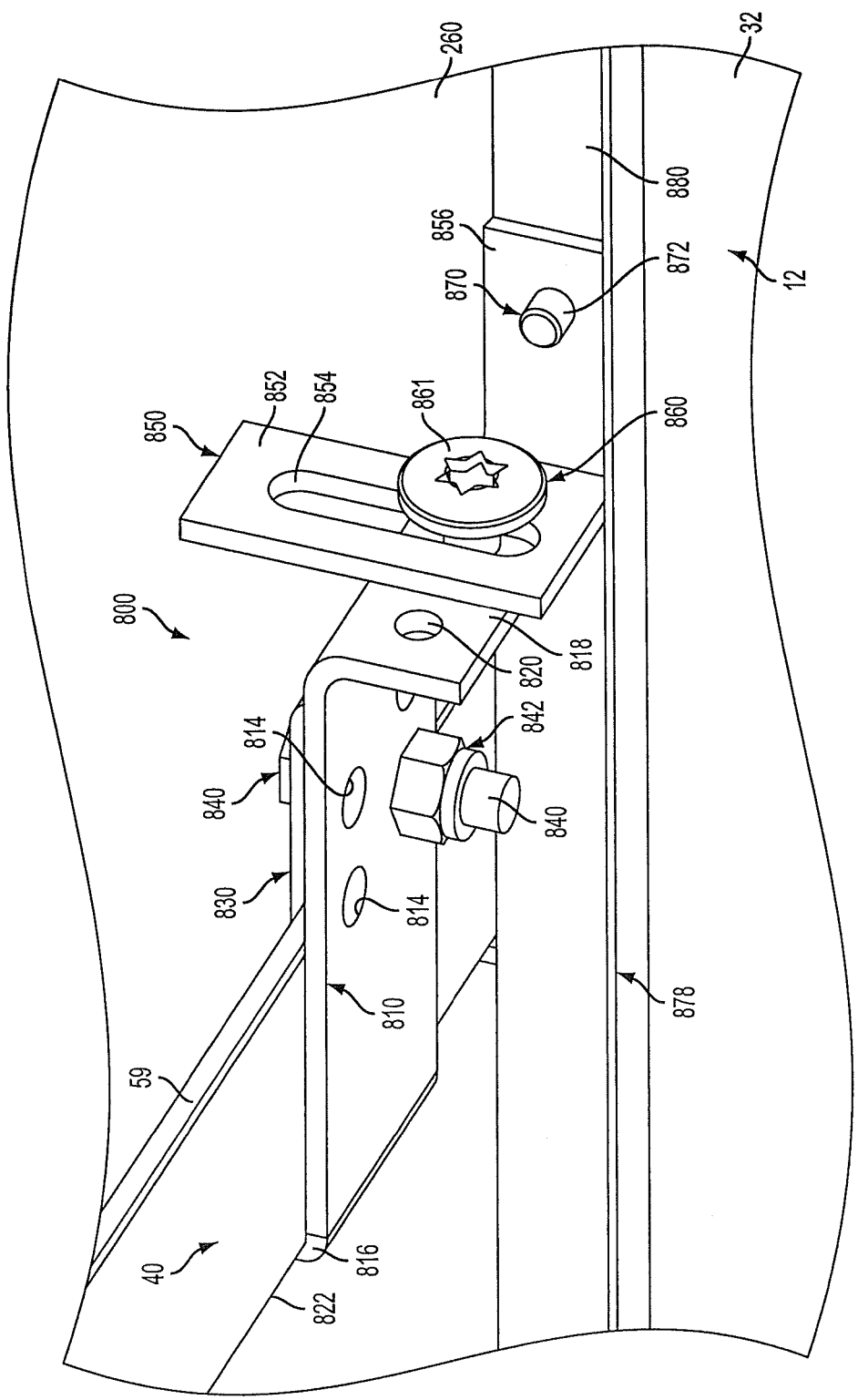
FIG. 28 is a perspective view of a tether assembly of the present disclosure for use with one of the side skirt systems showing the tether assembly coupled to a cross member of the trailer and the side skirt wall of the skirt system.
Figure 29:
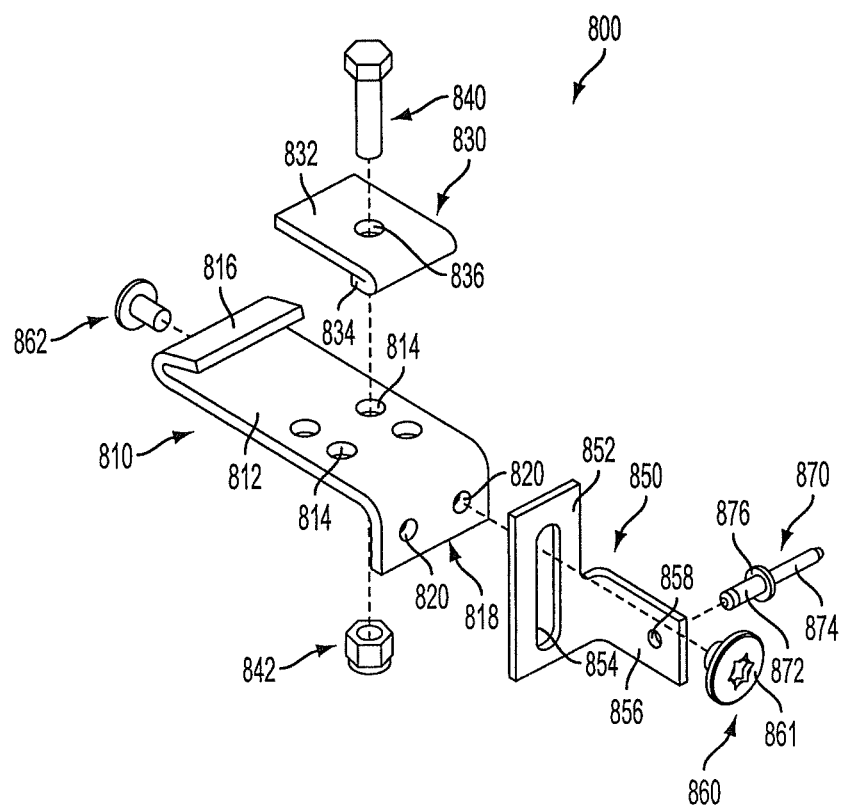
FIG. 29 is an exploded, perspective view of the tether assembly of FIG. 28.
Figure 30:
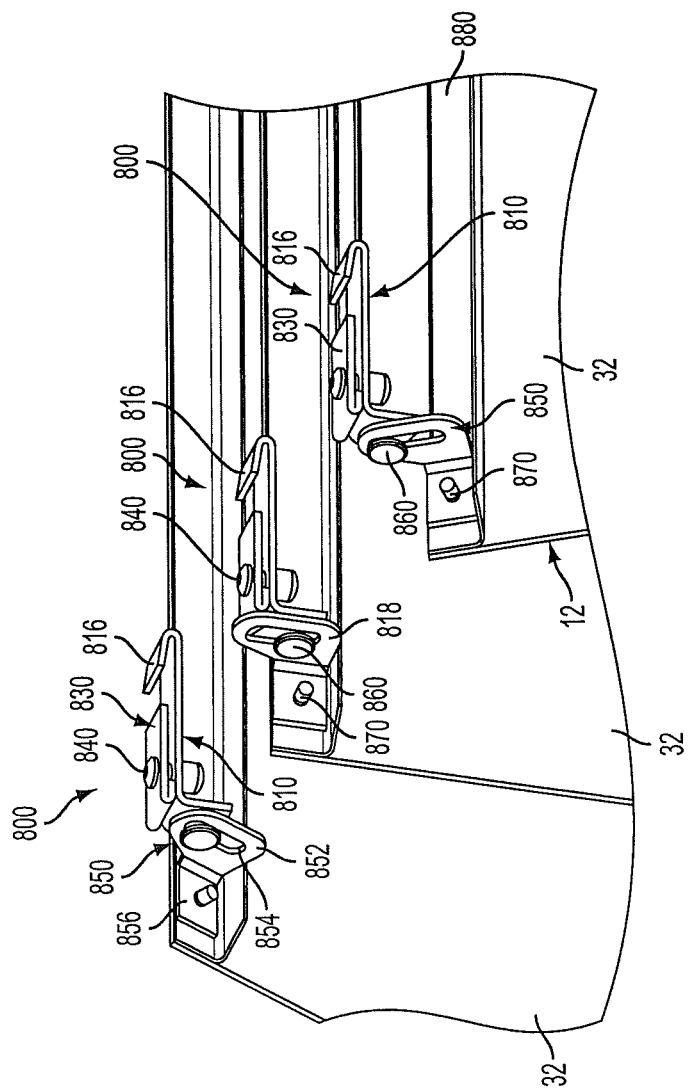
FIG. 30 is a perspective view of the tether assembly of FIG. 28 coupled to the side skirt system and showing the side skirt wall in an outward position, a vertical position, and an inward position.

Looking now to FIGS. 28-30, a tether assembly 800 is provided. The tether assembly 800 is coupled to both the trailer 10 and one of the side skirt systems disclosed above in order further maintain the connection between the side skirt wall and the trailer in the event that one of the mounting bracket assemblies happens to fail. The tether assembly 800 also operates to provide added lateral stiffness for the side skirt wall. Illustratively, as shown in FIG. 28, the tether assembly 800 is coupled to one of the cross members 40 of the trailer 10 as well as the side skirt panel 32 of the skirt system 12. It should be understood, however, that the tether assembly 800 may be used with any of the skirt systems disclosed above.

As shown in FIGS. 28 and 29, the tether assembly 800 includes a lower bracket 810 coupled to one of the cross members 40 of the trailer 10. Illustratively, multiple tether assemblies 800 may be used with skirt system. Such tether assemblies may be positioned along the length of the trailer and coupled to any number of cross members of the trailer to further connect the trailer to the skirt system. Illustratively, the bracket 810 includes a planar portion 812 having four apertures 814 formed therethrough. As shown in FIG. 28, the planar portion 812 of the lower bracket 810 is adjacent to and engaged with a bottom surface of the cross member 40. The lower bracket 810 further includes a curved or hook portion 816 coupled to one end of the planar portion 812 and a downwardly-extending flange portion 818 couple do the other end of the planar portion 812. As shown in FIG. 29, the flange portion 818 includes two apertures 820 formed therethrough. Illustratively, the hook portion 816 of the lower bracket 810 is configured to hook onto a side edge 822 of the bottom, horizontal flange 59 of the cross member 40 such that an upper surface of the planar portion 812 is engaged with a lower surface of the flange 59.

The tether assembly 800 further includes an upper bracket 830 coupled to the lower bracket 810. Illustratively, the upper bracket 830 includes a planar portion 832 and a spacer 834 coupled to the planar portion 832. An aperture 836 is formed through the planar portion 832. In use, a bottom surface of the planar portion 832 is adjacent an upper surface of the bottom flange 59 of the cross member 40, as shown in FIG. 28 and the aperture 836 of the upper bracket 830 is aligned with one of the four apertures 814 of the lower bracket 810. A fastener is provided to secure the upper bracket 830 and the lower bracket 810 to each other such that the flange 59 is positioned between the two brackets 810, 830. As shown in FIG. 29, the illustrative fastener is a bolt 840 and nut 842. However, it should be understood that any suitable fastener, such as a rivet, screw, or weld, for example, may be used. Further illustratively, while the aperture 836 of the upper bracket 830 is aligned with one particular aperture 814 of the lower bracket 810, it should be understood that the aperture 836 may be aligned with any of the four apertures 814. In particular, the apertures 814 of the lower bracket 810 are provided to allow the lower bracket 810 to be used with cross members 40 having bottom flanges 59 of various widths. As such, the lower bracket 814 may include any suitable number of apertures positioned therethrough for use with any variety of differently-sized cross members.

Looking still to FIGS. 28 and 29, the tether assembly 800 further includes a pivot bracket 850 coupled to the lower bracket 810. Illustratively, the pivot bracket 850 is coupled to the downwardly-extending flange portion 818 of the lower bracket 810. The pivot bracket 850 includes a vertically-extending planar portion 852 having a vertically-elongated slot 854 formed therethrough. The pivot bracket 850 further includes a side flange portion 856 coupled to a side edge of the planar portion 852 and extending outwardly away from the planar portion 852 to define a plane generally perpendicular to a plane defined by the planar portion 852. An aperture 858 is formed through the flange portion 856.

Illustratively, the pivot bracket 850 is pivotably coupled to the lower bracket 810 by a fastener 860 including, for example, a tee nut 861 and a coordinating pivot bolt 862, as shown in FIG. 29. It should be understood, however, that any suitable fastener, such as a bolt, rivet, or screw, for example, may be used to pivotably secure the pivot bracket 850 and the lower bracket 810 together. Illustratively, the fastener 860, including the tee nut 861 and bolt 862, is received through the slot 854 of the pivot bracket 850 and one of the two apertures 820 of the flange portion 818 of the lower bracket 810. Accordingly, the fastener 860 operates as a pivot pin allowing the pivot bracket 850 to pivot thereabout. As noted below, the slot 854 in the planar portion 852 of the pivot bracket 850 enables the pivot bracket 850 to be able to translate relative to the upper and lower brackets 830, 810. Illustratively, while the pivot bracket 850 is shown to be secured to one particular aperture 820 of the lower bracket 810, it should be understood that the pivot bracket 850 may be coupled to the other aperture 820 as well. Illustratively, the flange portion 818 of the lower bracket 810 includes two apertures 820 to accommodate for road-side and curb-side installations of the tether assembly 800 to the trailer 10. In particular, in order to allow the tether assembly to be mounted at the forward-most end of the skirt assembly on both the road-side and the curb-side of the trailer 10, the two apertures 820 are provided. Furthermore, while the flange portion 818 of the lower bracket 810 includes two apertures 820, it should be understood that the flange portion 818 may include any suitable number of apertures 820 therethrough to further accommodate for various road-side and curb-side configurations.

The tether assembly 800 further includes a skirt fastener 870 configured to couple the pivot bracket 850 to the side skirt wall 30. Illustratively, the skirt fastener 870 is a blind rivet having an expandable rivet portion 872, including a head 876, and removable center pin 874. Illustratively, the skirt fastener 870 is coupled to and extends through an aperture (not shown) formed in an upper portion of the side skirt wall 32. This aperture is formed through a stiffener angle 878 coupled to an upper end portion of the side skirt wall 32. Illustratively, the rivet portion 872 is slip-fit into the aperture 858 of the flange portion 856 of the pivot bracket 850 to secure the flange portion 856 to the side skirt wall 32 such that the rivet portion 872 of the fastener 870 is positioned adjacent inside surface of the side skirt wall 32 and is received through the aperture 858 of the flange portion 856, as shown in FIGS. 28 and 30. In use, the rivet portion 872 of the fastener 870 expands when the center pin 874 is removed in order to fasten the pivot bracket 850 and the stiffener angle 878 together. As shown in FIG. 29, a rear surface (not shown) of the head 856 is adjacent to and engaged with an inner surface 880 of the stiffener angle 878 of side skirt wall 32. Illustratively, it should be understood that while the skirt fastener 870 is a blind rivet, any other suitable fastener, such as any suitable rivet, screw, weld, or bolt, for example, may be used as well.

In use, as noted above, the tether assembly 800 is provided as a back-up system to maintain the connection between the trailer 10 and the side skirt system 12 in the event that one of the mounting bracket assemblies coupling the side skirt system 12 to the trailer 10 fails. The tether assembly 800 also operates to provide added lateral stiffness for the side skirt wall 32. As shown in FIG. 30, the pivot bracket 850 of the tether assembly 800 moves with the side skirt panel 32 to which it is attached as the side skirt panel 32 articulates relative to the trailer both laterally inwardly and laterally outwardly. The upper and lower brackets 830, 810, however, remain stationary relative to the cross member 40 to which they are attached. Illustratively, as the side skirt wall 32 articulates laterally outwardly, the vertically-elongated slot 854 of the pivot bracket 850 allows the pivot bracket 850 to move with the side skirt wall 32 relative to the upper and lower brackets 830, 810. As shown, when the side skirt wall 32 is articulated laterally outwardly, the pivot fastener 860 is generally positioned at or toward the top of the slot 854. When the side skirt wall 32 is in a generally vertical orientation relative to the trailer 10, however, the pivot fastener 860 is generally positioned toward the bottom of the slot 854. Finally, when the side skirt wall 32 is articulated laterally outwardly, the pivot fastener 860 is again generally positioned at or toward the top of the slot 854.

Figure 31:
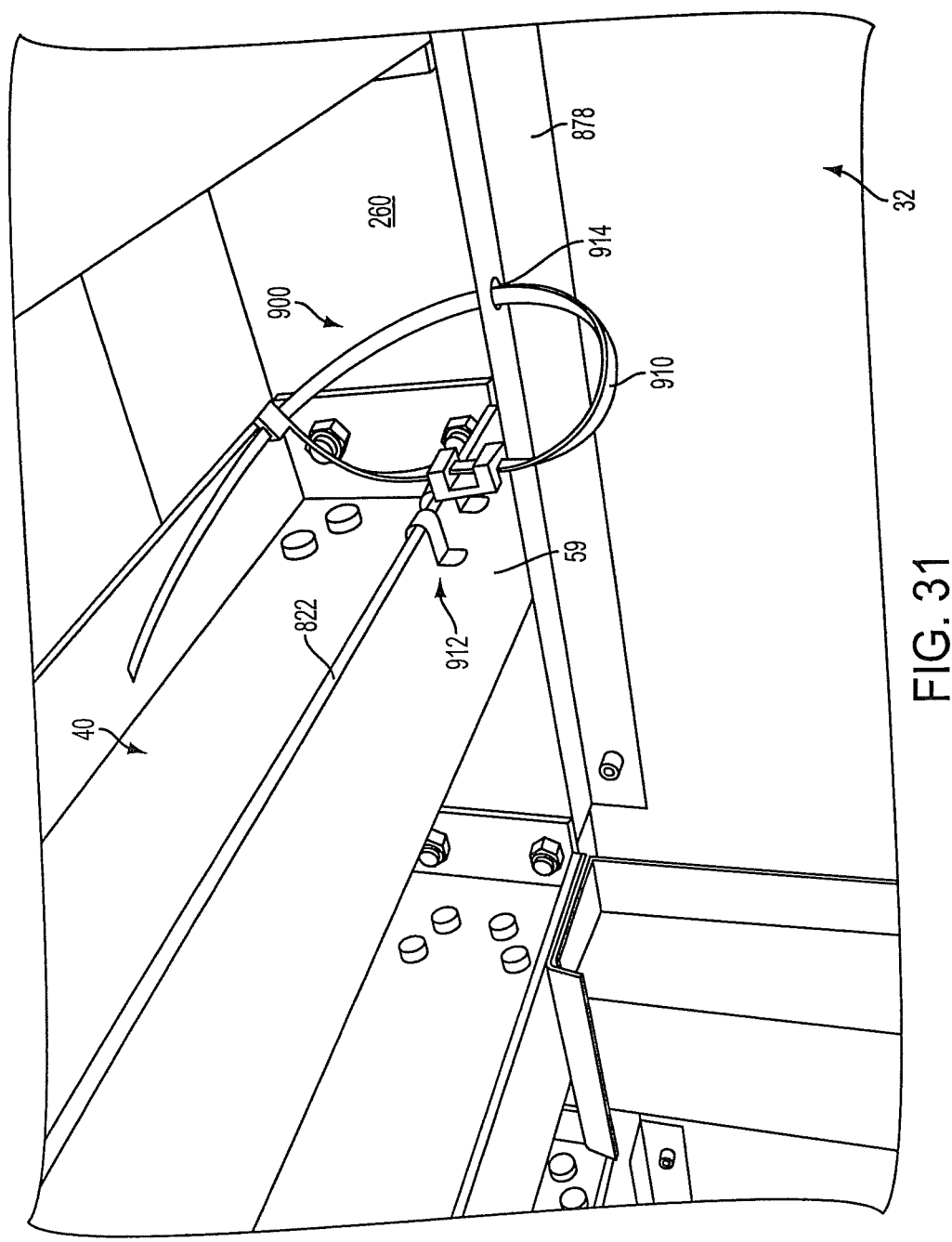
FIG. 31 is a perspective view of another tether assembly coupled to the side skirt system and the trailer.

While the particular tether assembly 800 is shown and described herein, it should be understood that any suitable tether assembly which operates to couple the side skirt wall 32 to the trailer 10 while allowing for inward and outward lateral movement of the side skirt wall 32 relative to the trailer 10 is provided. In particular, as shown in FIG. 31, an alternative tether assembly 900 includes a simple zip tie 910 and a mounting bracket 912. Illustratively, the mounting bracket 912 is coupled to the side edge 822 of the bottom flange 59 of one of the cross members 40 and the zip tie 910 is coupled to the mounting bracket 912. An aperture 914 is formed through the stiffener angle 878 of the side skirt wall 32 and the body of the zip tie 910 is looped therethrough in order to further secure the side skirt wall 32 to the cross member 40. Illustratively, while the zip tie 910 is shown, it should be understood that any suitable type of loop or strap connecting the side skirt panel 32 to the trailer 10 may be used as well.

Figure 32:
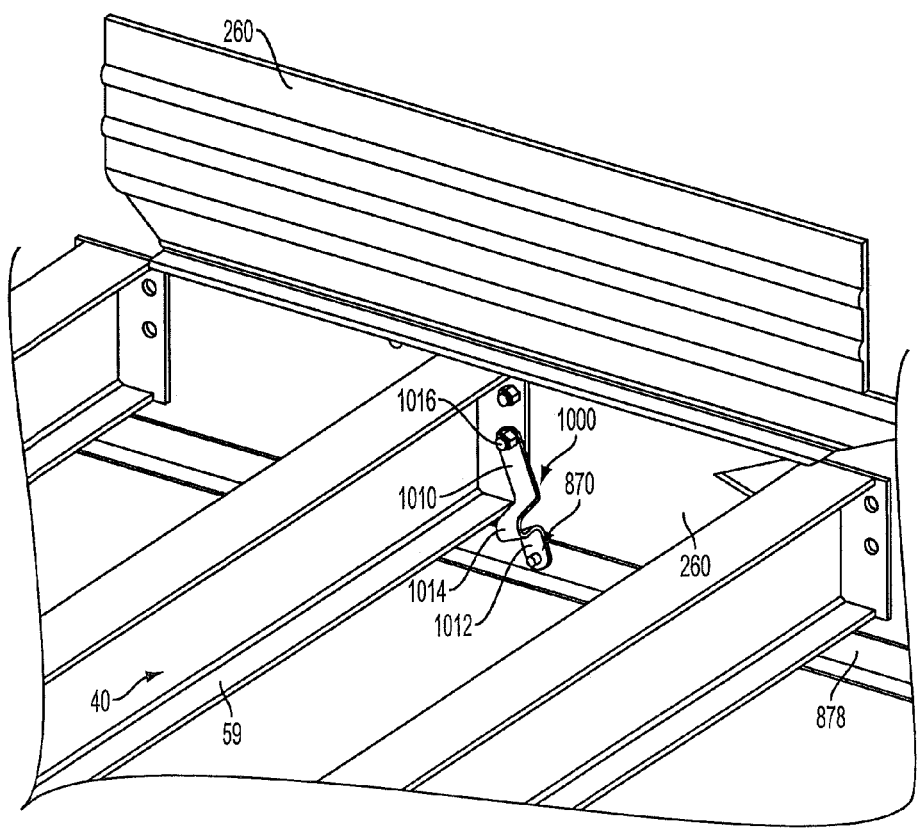
FIG. 32 is a perspective view of still another tether assembly coupled to the side skirt system and the trailer.

Further illustratively, another alternative tether assembly 1000 may be used to couple the side skirt wall 32 to one of the cross members 40 of the trailer 10. As shown in FIG. 32, for example, the tether assembly 1000 includes a first arm 1010 coupled to the base rail 260 of the trailer 10, a second arm 1012 coupled to the stiffener angle 878 of the side skirt wall 830, and a spring member, or living hinge, 1014 between the first and second arms 1010, 1012. Illustratively, the first arm 1010 is coupled to the base rail 260 by a bolt 1016, however, any suitable fastener may be used. Further illustratively, the second arm 1012 is coupled to the side skirt wall 32 by the skirt fastener 870 described above in regards to the tether assembly 800. In use, the living hinge 1014 allows the tether assembly 1000 to move with the side skirt wall 32 as the side skirt wall 32 moves laterally inwardly and outwardly relative to the trailer 10.

Illustratively, as noted above, the tether assemblies 800, 900, 1000 may be located along a length of each side skirt panel 32 between the mounting bracket assemblies which are positioned at either end of each side skirt panel 32 and which operate to couple adjacent side skirt panels 32 to each other and to the trailer 10. In particular, two tether assemblies may be coupled to each side skirt panel 32 such that the tether assemblies are located spaced generally equidistantly from either end of the side skirt panel 32. In other words, the two tether assemblies may be respectively located at approximately one-third the length of the panel 32 and two-thirds the length of the panel 32. However, it should be understood that any suitable number of tether assemblies may be used in association with each side skirt panel 32 and these tether assemblies may be spaced any distance apart from each other and positioned at any location along the entire length of the side skirt system.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A side skirt system for reducing drag on a trailer, comprising:
   a side skirt wall configured to be coupled to one side of the trailer to extend below a side wall of the trailer at least partially along a length of the trailer; and
   a mounting bracket assembly coupled to the side skirt wall and configured to be coupled to a floor assembly of the trailer, wherein the mounting bracket assembly and the side skirt wall are configured to tilt laterally inwardly with respect to a generally vertical axis parallel to the side skirt wall, and wherein the mounting bracket assembly includes a vertically-extending extension spring having a first end configured to be coupled to the floor assembly of the trailer and a second end coupled to the side skirt wall for movement with the side skirt wall,
   wherein the mounting bracket assembly further includes a vertically-extending channel mount coupled to the side skirt wall and configured to move with the side skirt wall, and wherein the channel mount includes a vertically-extending channel and the extension spring is received within the channel, and
   wherein the channel mount includes a front wall generally parallel with the side skirt wall, first and second side walls coupled to the front wall, and first and second flanges coupled to the respective first and second side walls, wherein the first and second flanges are coupled to the side skirt wall.

2. The side skirt system of claim 1, wherein the extension spring is configured to bias the side skirt wall to a generally vertical position parallel with the vertical axis.

3. The side skirt system of claim 1, wherein the extension spring is adjacent side skirt wall.

4. The side skirt system of claim 1, wherein the side skirt wall includes a plurality of side skirt wall panels and wherein the mounting bracket assembly is positioned adjacent two adjoining side skirt wall panels such that the first flange is coupled to a first skirt panel and the second flange is coupled to a second skirt panel adjacent the first skirt panel.

5. The side skirt system of claim 1, wherein the mounting bracket assembly further includes a horizontal cross-pin coupled to and extending between the first and second side walls of the channel mount, and wherein the second end of the extension spring is coupled to the horizontal cross-pin.

6. The side skirt system of claim 1, wherein the side skirt wall further includes a single flexible flap coupled to a bottom portion of the side skirt wall.

7. The side skirt system of claim 1, wherein the side skirt wall and the mounting bracket assembly are configured to move laterally outwardly with respect to the vertical axis.

8. The side skirt system of claim 1, further comprising a tether assembly spaced-apart from the mounting bracket and having a first end coupled to the side skirt wall and a second end configured to be coupled to the floor assembly of the trailer.

9. The side skirt system of claim 1, where the side skirt wall is configured to be angled relative to the side wall of the trailer when the trailer is viewed from above such that the side skirt wall is angled outwardly from the front end of the trailer to the rear end of the trailer.

10. A side skirt system for reducing drag on a trailer, comprising:
a side skirt wall configured to be coupled to one side of the trailer to extend below a side wall of the trailer at least partially along a length of the trailer, wherein the side skirt wall is tiltable laterally outwardly and laterally inwardly relative to the trailer with respect to a generally vertical axis parallel to the side wall of the trailer;
a generally-vertical extension spring having a first end configured to be coupled to a floor assembly of the trailer and a second end coupled to the side skirt wall such that the extension spring biases the side skirt wall to a generally vertical position parallel with the vertical axis; and
a mounting bracket assembly coupled to the side skirt wall and configured to be coupled to a floor assembly of the trailer, wherein the mounting bracket assembly includes a vertically-extending channel mount coupled directly to an inner surface of the side skirt wall, wherein the channel mount defines a vertically-extending channel and the extension spring is received within the channel.

11. The side skirt system of claim 10, wherein the side skirt wall includes a rigid wall panel made of a composite material and a flexible flap coupled to a bottom portion of the wall panel.

12. The side skirt system of claim 10, wherein the channel mount is configured to move laterally outwardly and laterally inwardly with the side skirt wall.

13. The side skirt system of claim 10, wherein the side skirt wall remains generally straight when the side skirt wall is positioned vertically and when the side skirt wall is moved laterally inwardly and laterally outwardly.

14. The side skirt system of claim 10, wherein the side skirt wall is configured to tilt approximately 30 degrees laterally outwardly relative to the vertical axis and approximately 30 degrees laterally inwardly relative to the vertical axis.

15. The side skirt system of claim 10, wherein the channel mount further includes a top wall configured to be coupled to the floor assembly of the trailer and a spring mount extending downwardly from the top wall, wherein the first end of the extension spring is coupled to the spring mount at a location below the top wall of the channel mount.

* * * * *